US008113943B2

(12) United States Patent
Cuddy

(10) Patent No.: US 8,113,943 B2
(45) **Date of Patent: *Feb. 14, 2012**

(54) GAMING DEVICE WITH CHANGING WILD SYMBOLS

(75) Inventor: Ryan W. Cuddy, Reno, NV (US)

(73) Assignee: IGT, Reno, NV (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/401,330

(22) Filed: Mar. 10, 2009

(65) Prior Publication Data

US 2009/0170592 A1 Jul. 2, 2009

Related U.S. Application Data

(63) Continuation of application No. 10/956,303, filed on Oct. 1, 2004, now Pat. No. 7,513,826.

(51) Int. Cl.
*A63F 9/24* (2006.01)
*A63F 13/00* (2006.01)

(52) U.S. Cl. ................ 463/20; 463/16; 463/17; 463/18; 463/19; 463/25; 463/29

(58) Field of Classification Search .............. 463/16–20, 463/25, 29
See application file for complete search history.

(56) References Cited

U.S. PATENT DOCUMENTS 3,667,757 A 6/1972 Holmberg
4,448,419 A 5/1984 Telnaes
4,648,600 A 3/1987 Olliges
4,743,022 A 5/1988 Wood
4,836,553 A 6/1989 Suttle et al.
4,861,041 A 8/1989 Jones et al.
5,078,405 A 1/1992 Jones et al.
5,098,107 A 3/1992 Boylan et al.
5,154,429 A 10/1992 LeVasseur
5,308,065 A 5/1994 Bridgeman et al.
5,332,219 A 7/1994 Marnell, II et al.
5,332,228 A 7/1994 Schultz
5,393,057 A 2/1995 Marnell, II (Continued)

FOREIGN PATENT DOCUMENTS

AU B-43613/97 2/1998

(Continued)

OTHER PUBLICATIONS

A New Three of a Kind article, written by Strictly Slots, published in Jan. 2005.

(Continued)

*Primary Examiner* — Peter DungBa Vo
*Assistant Examiner* — Jasson Yoo
(74) *Attorney, Agent, or Firm* — K&L Gates LLP

(57) ABSTRACT

A bonus game that operates in combination with a slot machine base game is provided. The bonus game includes a series of free spins or free evaluations in which symbols of a set of symbols are set to be wild symbols. Free spins occur for each symbol acting as a wild symbol until the symbol appears on the reels in a winning format, either alone or in combination with other symbols. Then, the next symbol of the set is used in the wild symbols and so on until all symbols for the set are used. If free spins remain after all symbols of the set are used, the free spin sequence is repeated until the free spins are exhausted.

20 Claims, 16 Drawing Sheets

U.S. PATENT DOCUMENTS 5,407,200 A 4/1995 Zalabak
5,423,539 A 6/1995 Nagao
5,431,408 A 7/1995 Adams
5,449,173 A 9/1995 Thomas et al.
5,489,101 A 2/1996 Moody
5,560,603 A 10/1996 Seelig et al.
5,647,798 A 7/1997 Falciglia
5,720,662 A 2/1998 Holmes, Jr. et al.
5,722,891 A 3/1998 Inoue
5,762,552 A 6/1998 Vuong et al.
5,772,506 A 6/1998 Marks et al.
5,775,692 A 7/1998 Watts et al.
5,807,172 A 9/1998 Piechowiak
5,816,915 A 10/1998 Kadlic
5,823,534 A 10/1998 Banyai
5,823,873 A 10/1998 Moody
5,823,874 A 10/1998 Adams
5,848,932 A 12/1998 Adams
5,855,514 A 1/1999 Kamille
5,868,618 A 2/1999 Netley et al.
5,868,619 A 2/1999 Wood et al.
5,873,781 A 2/1999 Keane
5,882,259 A 3/1999 Holmes, Jr. et al.
5,882,261 A 3/1999 Adams
5,918,880 A 7/1999 Voigt, IV et al.
5,934,672 A 8/1999 Sines et al.
5,935,002 A 8/1999 Falciglia
5,944,315 A 8/1999 Mostashari
5,964,463 A 10/1999 Moore, Jr.
5,971,849 A 10/1999 Falciglia
5,980,384 A 11/1999 Barrie
5,988,638 A 11/1999 Rodesch et al.
6,003,867 A 12/1999 Rodesch et al.
6,004,207 A 12/1999 Wilson, Jr. et al.
6,007,066 A 12/1999 Moody
6,012,982 A 1/2000 Piechowiak et al.
6,059,289 A 5/2000 Vancura
6,059,658 A 5/2000 Mangano et al.
6,089,977 A 7/2000 Bennett
6,102,400 A 8/2000 Scott et al.
6,117,009 A 9/2000 Yoseloff
6,120,031 A 9/2000 Adams
6,120,378 A 9/2000 Moody
6,149,521 A 11/2000 Sandusky
6,159,095 A 12/2000 Frohm et al.
6,165,070 A 12/2000 Nolte et al.
6,173,955 B1 1/2001 Perrie et al.
6,174,233 B1 1/2001 Sunaga et al.
6,186,894 B1 2/2001 Mayeroff
6,190,254 B1 2/2001 Bennett
6,190,255 B1 2/2001 Thomas et al.
6,203,429 B1 3/2001 Demar et al.
6,220,959 B1 4/2001 Homes, Jr. et al.
6,234,897 B1 5/2001 Frohm et al.
6,251,013 B1 6/2001 Bennett
6,270,409 B1 8/2001 Shuster
6,270,411 B1 8/2001 Gura et al.
6,290,600 B1 9/2001 Glasson
6,299,165 B1 10/2001 Nagano
6,299,170 B1 10/2001 Yoseloff
6,302,398 B1 10/2001 Vecchio
6,305,686 B1 10/2001 Perrie et al.
6,311,976 B1 11/2001 Yoseloff et al.
6,312,334 B1 11/2001 Yoseloff
6,315,660 B1 11/2001 DeMar et al.
6,315,663 B1 11/2001 Sakamoto
6,322,078 B1 11/2001 Adams
6,336,860 B1 1/2002 Webb
6,340,158 B2 1/2002 Price et al.
6,358,144 B1 3/2002 Kaddlic et al.
6,364,768 B1 4/2002 Acres et al.
6,394,902 B1 5/2002 Glavich et al.
6,398,644 B1 6/2002 Perrie et al.
6,416,408 B2 7/2002 Tracy et al.
6,419,579 B1 7/2002 Bennett
6,428,412 B1 8/2002 Anderson et al.
6,431,548 B1 8/2002 Voigt, IV et al.
6,439,995 B1 8/2002 Hughs-Baird et al.
6,443,452 B1 9/2002 Brune
6,454,266 B1 9/2002 Breeding et al.
6,471,208 B2 10/2002 Yoseloff et al.
6,481,713 B2 11/2002 Perrie et al.
6,491,584 B2 12/2002 Graham et al.
6,494,454 B2 12/2002 Adams
6,506,118 B1 * 1/2003 Baerlocher et al. ............. 463/25
6,517,432 B1 2/2003 Jaffe
6,537,150 B1 3/2003 Luciano et al.
6,537,152 B2 3/2003 Seelig et al.
6,551,187 B1 4/2003 Jaffe
6,561,904 B2 5/2003 Locke et al.
6,565,436 B1 5/2003 Baerlocher
6,589,114 B2 7/2003 Rose
6,602,137 B2 8/2003 Kaminkow et al.
6,604,740 B1 8/2003 Singer et al.
6,616,142 B2 9/2003 Adams
6,644,663 B2 11/2003 Seelig et al.
6,712,694 B1 3/2004 Nordman
6,719,630 B1 4/2004 Seelig et al.
6,729,621 B2 5/2004 Moody
6,733,389 B2 5/2004 Webb et al.
6,780,109 B2 8/2004 Kaminkow
6,805,349 B2 10/2004 Baerlocher et al.
6,866,583 B2 3/2005 Glavich et al.
6,869,360 B2 3/2005 Marks et al.
6,905,406 B2 6/2005 Kaminkow et al.
6,913,532 B2 7/2005 Baerlocher et al.
6,921,335 B2 7/2005 Rodgers et al.
6,955,600 B2 10/2005 Glavich et al.
7,056,213 B2 6/2006 Ching et al.
7,238,110 B2 7/2007 Glavich et al.
7,322,887 B2 1/2008 Belger et al.
7,331,862 B2 2/2008 Rodgers et al.
7,331,866 B2 2/2008 Rodgers et al.
7,381,134 B2 6/2008 Cuddy et al.
7,402,103 B2 7/2008 Baerlocher
7,473,147 B2 1/2009 Zahnen
7,481,708 B2 1/2009 Baerlocher et al.
7,513,826 B2 * 4/2009 Cuddy ............................ 463/20
2001/0009865 A1 7/2001 Demar et al.
2002/0010017 A1 1/2002 Bennett
2002/0193160 A1 12/2002 Tarantino
2003/0017865 A1 1/2003 Beaulieu et al.
2003/0060272 A1 3/2003 Glavich et al.
2003/0064802 A1 4/2003 Rodgers et al.
2003/0073483 A1 4/2003 Glavich et al.
2003/0162585 A1 8/2003 Bigelow et al.
2003/0203752 A1 10/2003 Kaminkow et al.
2003/0203753 A1 10/2003 Muir et al.
2004/0002372 A1 1/2004 Rodgers et al.
2004/0038731 A1 2/2004 Englman
2004/0048646 A1 * 3/2004 Visocnik ......................... 463/16
2004/0053666 A1 3/2004 Vancura
2004/0053669 A1 3/2004 Gerrard et al.
2004/0053672 A1 3/2004 Baerlocher
2004/0053676 A1 3/2004 Rodgers
2004/0072612 A1 4/2004 Rodgers et al.
2004/0137982 A1 7/2004 Cuddy et al.
2004/0147306 A1 7/2004 Randall et al.
2004/0266516 A1 12/2004 Thomas
2004/0266517 A1 12/2004 Thomas
2005/0020344 A1 1/2005 Kaminkow
2005/0049035 A1 3/2005 Baerlocher et al.
2005/0064924 A1 3/2005 Glavich et al.
2005/0070354 A1 3/2005 Baerloche et al.
2005/0233801 A1 10/2005 Baerlocher et al.
2005/0266917 A1 12/2005 Glavich et al.
2006/0068884 A1 3/2006 Baerlocher et al.
2006/0068885 A1 3/2006 Cregan et al.
2006/0199636 A1 9/2006 Ching et al.
2006/0199637 A1 9/2006 Ching et al.
2006/0246989 A1 11/2006 Glavich et al.
2007/0021188 A1 1/2007 Rodgers et al.
2007/0060294 A1 3/2007 Cuddy et al.
2007/0087809 A1 4/2007 Baerlocher
2007/0287521 A1 12/2007 Glavich et al.
2008/0113761 A1 5/2008 Belger et al.
2008/0139296 A1 6/2008 Baerlocher et al.

| | | | |
|---|---|---|---|
| 2008/0139298 | A1 | 6/2008 | Rodgers et al. |
| 2008/0200232 | A1 | 8/2008 | Baerlocher et al. |
| 2008/0200237 | A1 | 8/2008 | Cuddy et al. |

FOREIGN PATENT DOCUMENTS

| | | | |
|---|---|---|---|
| EP | 0 060 019 | A1 | 9/1982 |
| EP | 0 874 337 | | 10/1998 |
| EP | 0 981 119 | A2 | 2/2000 |
| EP | 0 984 408 | A2 | 3/2000 |
| EP | 1 296 296 | A2 | 3/2003 |
| EP | 1 513 117 | A2 | 3/2005 |
| GB | 2 084 371 | | 4/1982 |
| GB | 2101380 | A | 1/1983 |
| GB | 2 180 087 | | 3/1987 |
| GB | 2 181 589 | | 4/1987 |
| GB | 2 222 712 | | 3/1990 |
| GB | 2 322 217 | A | 8/1998 |
| WO | WO 97/32285 | | 9/1997 |
| WO | WO 00/32286 | | 6/2000 |
| WO | WO 01/26019 | A1 | 4/2001 |
| WO | WO 2004/025584 | A2 | 3/2004 |

OTHER PUBLICATIONS

Andy Capp Bally Gaming article written by Strictly Slots, published in Feb. 2002.
Andy Capp Hits the Bullseye as a New Evo Video advertisement, written by Bally Gaming Systems, published in 2001.
Bally Live! Special Global Gaming Expo 2002 issue, written by Bally Gaming Systems, published in 2002.
Black Swan paytable display written by IGT, published prior to Dec. 2001.
Boot Scootin article written by Strictly Slots/Aristocrat Leisure Industries, PTY Ltd., published in Apr. 2001.
Break the Spell advertisement written by Atronic Casino Technology, Ltd., published in 1999, on or before December thereof.
Break the Spell advertisement, published in 1999, on or before December thereof.
Break the Spell article written by Strictly Slots/Atronic Casino Technology, Ltd., published in Sep. 2000.
Break the Spell website page, Atronic Americas, Strictly Slots, published in 1999, 2000, printed on Jan. 15, 2001.
Cash Chameleon article written by Strictly Slots/Aristocrat Leisure Industries, PTY Ltd., published in Apr. 2001.
Castaways Atronic Americas advertisement, published in Strictly Slots in Dec. 2000.
Catch a Wave Advertisement written by IGT, published in Dec. 2000.
Catch a Wave advertisement, published by Bally Gaming Systems prior to Oct. 1, 2004.
Cleopatra advertisement, published by GameQuest2002 prior to Oct. 1, 2004.
Cleopatra game advertisement printed from http://www.igt.com/games/new_games/cleopatra.html, printed on Mar. 21, 2001.
Cleopatra iGame-Plus Series advertisement, written by IGT, published in 2000.
Cleopatra Slot Spotlight article written by IGT, published prior to Oct. 1, 2004.
Cleopatra Slots—5 Reel/9 Line Vision Series, written by IGT, published in 2004.
Cleopatra Slots 90-coin advertisement, published in HotNewGames prior to Oct. 1, 2004.
Cleopatra Slots advertisement written by IGT, published in 2002.
Cleopatra Slots advertisement written in Game News by IGT, published in 2003.
Cleopatra Slots advertisement, written by IGT in Strictly Slots, published in Sep. 2002.
Cleopatra Slots S2000 Series advertisement, written by IGT, published in 2002.
Cleopatra Slots Vision Series advertisement, written by IGT, published in 2003.
Cossack Dance advertisement written by Olympic Video Gaming, published prior to Jan. 2003.
Cuckoo advertisement written by Aristocrat, published in Feb. 1998.
Cuckoo advertisement written by Aristocrat, published prior to Oct. 1, 2004.
Description of Symbol Feature in Australian UFO Gaming Machine written by Barcrest Ltd., published in 1995, on or before December thereof.
Dolphin Treasure Advertisement written by Aristocrat Leisure Industries Pty., Ltd., published in 1996.
Don't Settle for 2nd Class in Class II advertisement, written by Sodak Gaming, published in 2004.
Double Diamond 2000 website http://www.igt.com/games/new_games/dd2000.html, printed on Mar. 21, 2001.
Enchanted Forest brochure, Aristocrat, Incorporated, published in 1995, on or before December thereof.
Enchanted Forest™ gaming description from Aristocrat, available in 1994, on or before December thereof.
Enchanted Unicorn advertisement written by IGT, published in 2001, on or before December thereof.
Field Testing New Slots article, written by Strictly Slots, published in Jul. 2000.
Fishin' Buddies article published in Strictly Slots/Anchor Games, published in Apr. 2001.
Happy Camper advertisement written by IGT, published in 2001, on or before December thereof.
Introducing the "Smiling Ape" Machine advertisement (including Joker's Wild Poker description) written by IGT, published prior to Jan. 2002.
It's a Blast Video Slots Game King Series game advertisement, published by IGT, published in 2004.
Jackpot Party brochure and articles written by WMS Gaming, Inc., published in 1988, on or before December thereof.
Jazzy Jackpots Atronic Americas article, published in Strictly Slots in Mar. 2001.
Jazzy Jackpots Cashline advertisement, published by Atronic in 2000.
Joker's Wild advertisement written by IGT, published prior to Jan. 2002.
King of the Nile advertisement written by Aristocrat Technologies, published in Strictly Slots in Sep. 2003.
Little Green Men, Jr. advertisement written by A.C. Coin and Slot Services Company, published prior to Jan. 2003.
Loco Loot article written by Strictly Slots/Aristocrat Leisure Industries, PTY Ltd., published in May 2002.
Luau Party Bally Gaming and Systems article, written by Bally Gaming Systems, published in Strictly Slots in Mar. 2005.
Mata Hari Slots—5 Reel/9 Line advertisement written by IGT, published in 2004.
Mata Hari Slots Vision Series advertisement written by IGT, published in 2002.
Monopoly Moneyline WMS Gaming, written by Strictly Slots, published in Nov. 2003.
Monte Carlo advertisement, written by Bally Gaming Systems, published in 2002.
Mountain Money article written by Strictly Slots/Aristocrat Leisure Industries, PTY Ltd., published in Jun. 2002.
Mystical Mermaid Video Slots advertisement, published by IGT prior to 2003.
Mystical Mermaid Video Slots Game King Video Slots advertisement, written by IGT, published in 2004.
Penguin Pays advertisement written by Aristocrat Incorporated, published in 1998, on or before December thereof.
Playboy Slots Fourth-Reel Playmate Multiplier Symbols advertisement, written by Bally Gaming Systems, published in 2003.
Playboy Slots Introducing the Eye-Catching New Playboy EVO Video Slot advertisement, written by Bally Gaming Systems, published in 2003.
Playboy Slots Playmate Bonus-Reel Symbols advertisement, written by Bally Gaming Systems, published in 2003.
Pyramid-Power!! advertisement written by MegaJackpots News, published prior to Oct. 1, 2005.
Reel Magic™ gaming machine description written by IGT, available in 1986, on or before December thereof.
Slots 2003 article written by Melissa Raimondi, published in Strictly Slots in Jan. 2003.
SnapShot Aristocrat Technologies article, published in Strictly Slots in Aug. 2003.

Spin Til You Win Game Description written by IGT, published in 1996.
Spinning Slots of All Time advertisement, written by Bally Gaming Systems, published prior to Oct. 1, 2004.
The $1,000,000 Pyramid advertisement, written by IGT, published in 2001.
The $1,000,000 Pyramid advertisement, written by IGT, published prior to Oct. 1, 2004.
The Basics of Winning Video Poker (Chapter VI Deuces Wild & Chapter VII Jokers Wild) written by J. Edward Allen, published in 1990, on or before December thereof.
The Dating Game advertisement, written by Slot Spotlight, published in Strictly Slots in Aug. 2004.
The Latest Buzz article, written by Bally Gaming Systems, published in 2000, on or before December thereof.
The Munsters iGame-Plus Series advertisement, written by IGT published in 2001.
The Munsters International Game Technology advertisement, written by Strictly Slots, published in Apr. 2001.
The Sign of the Zodiac (e-motion) Atronic Americas article published by Strictly Slots in Apr. 2004.
The Sign of the Zodiac Atronic article, published in Strictly Slots in Aug. 2003.
The Sign of the Zodiac Cashline, written by Atronic, published in 2003.
Wild Bear Salmon Run Advertisement written by IGT, published in 2003.
Wild Streak Advertisement written by WMS Gaming, Inc., published in 2001, on or before December thereof.
Your Real Key to Gaming Success advertisement (including Roll Over Beethoven and Wild Fortune) written by Olympic Video Gaming, published prior to Jul. 31, 2003.

* cited by examiner

GAMING DEVICE WITH CHANGING WILD SYMBOLS

PRIORITY CLAIM

This application is continuation application of, claims priority to and the benefit of U.S. patent application Ser. No. 10/956,303, filed Oct. 1, 2004, the entire contents of which are incorporated herein.

BACKGROUND

Gaming device manufactures have long provided gaming machines employing a plurality of reels, wherein the reels each have a plurality of symbols. In the 1930's, gaming device manufacturers provided a three reel gaming device, wherein each reel had ten stops, which produced a thousand combinations. One way for the manufacturers to increase the number of combinations was to increase the size of the reel and to add more stops. During the next four decades, the reels in the gaming devices increased to twenty stops. In the 1970's, manufacturers developed a twenty-two stop reel machine, in the early 80's a twenty-five stop reel machine, and in 1985, International Game Technology, the assignee of the present invention, developed a thirty-two stop reel machine. This machine had 32,768 possible combinations.

Another way manufacturers increased the number of combinations was to add reels. In 1955, a manufacturer produced a four-reel slot machine, which increased the number of combinations to 160,000. In the middle 1970's, a manufacturer produced the first five-reel slot machine, which had twenty-two stop reels and produced combinations in excess of five million.

A subsequent advancement in the effort to produce more payout combinations was the video or CRT screen slot machine, wherein the reels were simulated as opposed to mechanical. Video slot machines do not have mechanical drums or reels which rotate, do not need to precisely stop the same at certain positions and are therefore not limited by a maximum allowable drum radius. Each reel can have an unlimited number of stops. Initially, the Nevada gaming Commission limited the stops on the video machines (e.g., eighty-four stops on a three reel machine) but has since removed the limit. In 1989, a particular video reel machine employed reels having hundreds of stops and millions of combinations.

The total number of combinations affects the percentage of time that a player will obtain a particular winning combination as well as the overall payout percentage of the machine. For example, a three reel machine having twenty-two stops per reel, where the first reel has two oranges, the second reel has three oranges, and the third reel has seven oranges will yield an orange, orange and orange combination 42 times in every 10,648 plays (22×22×22) or 0.39% of the time. If the orange, orange, orange combination pays 20 coins, then the total coins paid is 20×42 or 840 coins in every 10,648 plays. Adding the total coins paid for each winning combination and dividing that number by 10,648 yields the machine's total payout percentage.

In the known gaming systems the percentage of obtaining a winning combination is set. In certain known progressive gaming machines, the payout of a grand prize grows each time a player plays the machine. The increasing payout increases the total coins paid as shown above, which in turn increases the overall payout percentage. Nevertheless, the percentage of times that a player will receive one of the combinations remains constant.

Known gaming devices provide wild symbols or wild cards. Wild symbols provide a player with an additional opportunity to obtain winning combinations. In a slot machine, a wild symbol can enable the matching of symbols along a payline to achieve a winning combination. For example, in a three reel slot machine, the symbols along a payline on the first, second and third reels may be, respectively, a heart, a heart and a wild symbol. If, in the gaming scheme, the gaming device awards a player for a three heart symbol combination, the wild symbol substitutes for a heart and provides the player with that combination. In a video poker game, a wild symbol substitutes for a card. For example, in a five card draw poker gaming machine where the gaming device displays five cards, the cards can be a 10, Jack, Queen, King and wild card. The wild card substitutes for an Ace and provides the player with a winning combination.

Wild cards have been employed in gaming devices in other manners. For example, U.S. Pat. No. 5,431,408 discloses a gaming device having a video poker gaming scheme. A player is dealt a hand consisting of five cards. The player is also given a wild card. The wild card is separate from the dealt hand. The player can reserve the wild card for use with a subsequent hand. Thus, the player can use the wild card in a hand in which it is most advantageous to do so.

In another example, U.S. Pat. No. 6,089,977 discloses a gaming device having a roaming wild symbol. More specifically, the patent discloses a gaming device having a plurality of virtual reels which have a set of symbols. Certain symbol combinations serve as triggering events. When one of these combinations occur on the reels, a wild card symbol appears on the reels in the form of a graphical image and appears at different positions on the reels. At each position where the wild card symbols appears, the symbol transforms into the wild card symbol. After each transformation, the gaming device determines and pays the player for any winning combination which is the result of the transformation. When the wild card symbol appears at a next symbol position, the symbol previously transformed reverts to its original state.

Free spins or activations have also been provided in slot games. Upon winning free spins, the reels can auto-generate a number of outcomes and provide the player credits from winning symbol combinations occurring in the outcomes. Free spins provide an avenue for adding fun and excitement to standard gaming, while maintaining consistency with the slot base game and enabling the slot game to be played and displayed on simulated or electromechanical reels.

To increase player enjoyment and excitement, it is desirable to provide players with new types of gaming devices that attract the player and keep the player entertained.

SUMMARY

One embodiment of the present invention provides a bonus game that operates in combination with a slot machine base game. The bonus game includes a series of free activations, free spins, free deals, or free evaluations in which a symbol from a set of symbols is designated as a wild symbol. The player enters the free spin series or mode by triggering the series such as by obtaining a triggering symbol or combination in the base game. The symbols of the set are used sequentially as the wild symbol until the symbols each alone or in combination produce a win for the player. That is, a first symbol of the set is used in one or more of the free spins as the wild symbol until the first symbol produces a win alone or in combination with other symbols of a paytable. A second symbol is then selected as a wild symbol. The second symbol is used in one or more of the free spins as a wild symbol until the second symbol produces a win alone or in combination with other symbols of a paytable and so on. The sequence proceeds in this manner to use each symbol of the set. The free spins occur as long as the player has any of a provided amount of spins remaining in one embodiment.

The wild symbols can function as any symbol of a paytable of the slot machine in one embodiment. In one embodiment, the symbols or symbol combinations of the paytable appear from left to right on the reels, beginning with the left-most reel. In one embodiment, a wild symbol appearing on the left-most reel functions as each "single appearance" symbol of the paytable (i.e., needs only one appearance to produce a win such as a cherry symbol) and pays potentially for a plurality of different such single appearance symbols. The wild symbols can create a winning combination or enhance a winning combination that occurs even without the wild symbol. The player during the free spins in one embodiment also receives credits for winning symbols or combinations that result from the free spins without the aid of the wild symbol.

In one embodiment, if a number of spins remains after each symbol has been used until producing a win, the sequence is repeated using each symbol in the set as a wild symbol until the symbol produces a win. In another embodiment, the free spin game lasts, not until a provided amount of free spins run out, but instead until each of the symbols is used as a wild symbol and produces a win for the player. Here, this do-until type game makes the player want to accumulate as many wins without using the wild symbols before ultimately using up all of the wild symbols.

After the wild spin sequences of the present invention are provided, credits obtained from the free spins are provided to the player during a credit roll-up. The player can then resume playing the base game.

The sequence in which the various wild symbols are selected can be determined in a plurality of ways. In one embodiment, the sequence is fixed. In another embodiment, the sequence is determined randomly. In a further embodiment, a symbol appearing at a certain paystop or reel stop becomes the wild symbol. Or, a symbol appearing adjacent to the current wild symbol becomes the next wild symbol upon a wild symbol change. Further, a symbol appearing in a certain combination with at least one other symbol becomes the next wild symbol. A symbol appearing on the reels after a certain amount of spins may become the next wild symbol. Any suitable combination of the above methods may also be employed.

While the wild symbols are placed in a set separate from the other symbols of the paytable in one embodiment, the wild symbols do not have to belong to a separate set. That is, the wild symbols may belong or be chosen from the regular paytable of symbols. The wild symbols may be from a designated sub-set of paytable symbols or be any of or include each the paytable symbols. In either case, at least some of the paytable symbols operate (i) to provide a non-wild win alone or in combination, and/or (ii) provide wins acting as a wild symbol.

It is therefore an advantage of the present invention to provide a fun and exciting slot machine bonus game.

Another advantage of the present invention to provide a bonus game that uses the base game symbols in a fun and exciting way to provide a bonus game that is different yet related to the base game.

Additional features and advantages of the present invention are described in, and will be apparent from, the following Detailed Description of the Invention and the figures.

Additional features and advantages are described herein, and will be apparent from the following Detailed Description and the figures.

DETAILED DESCRIPTION

Figure 1A:
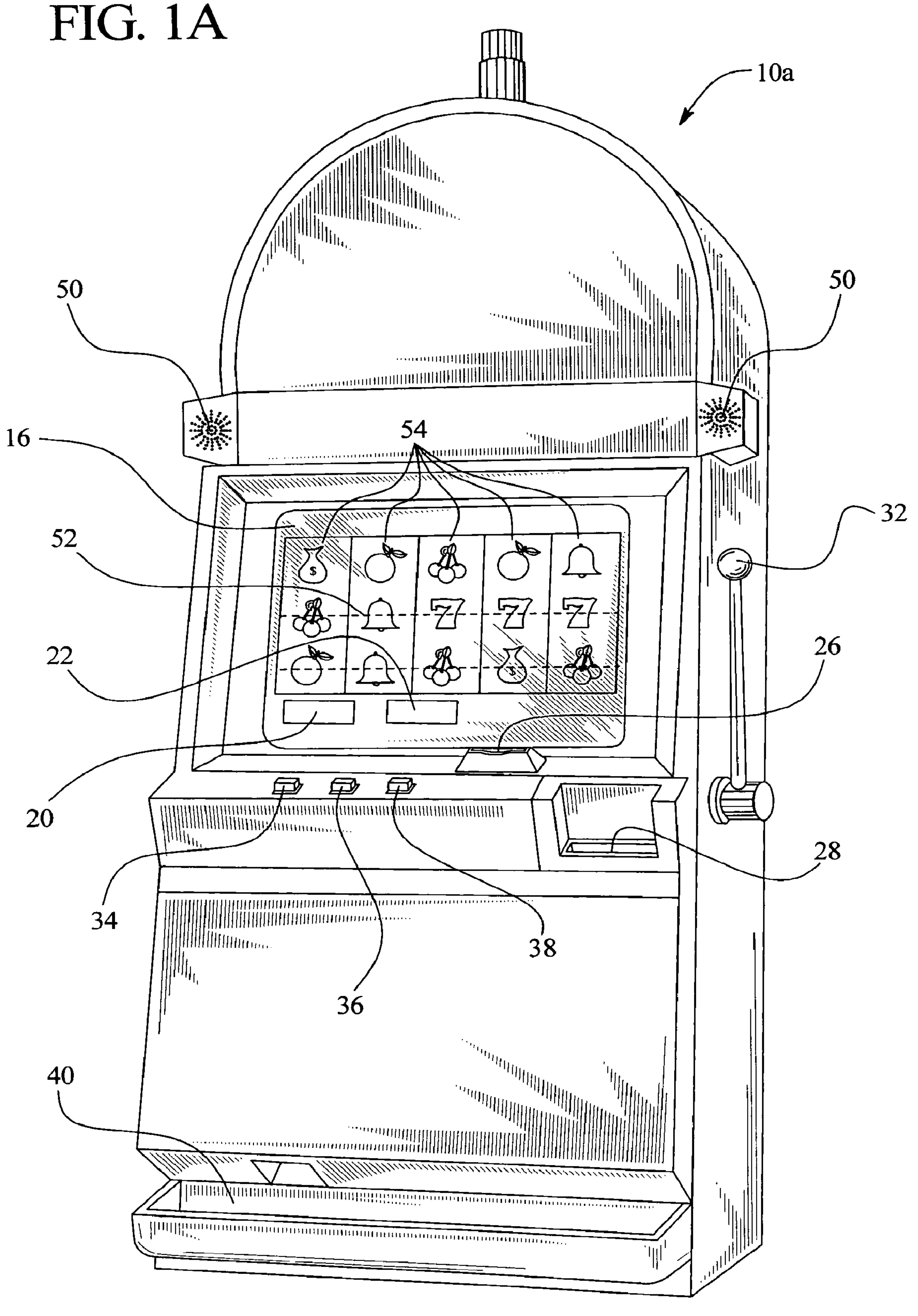
FIG. 1A is a front perspective view of one embodiment of the gaming device of the present invention.
Figure 1B:
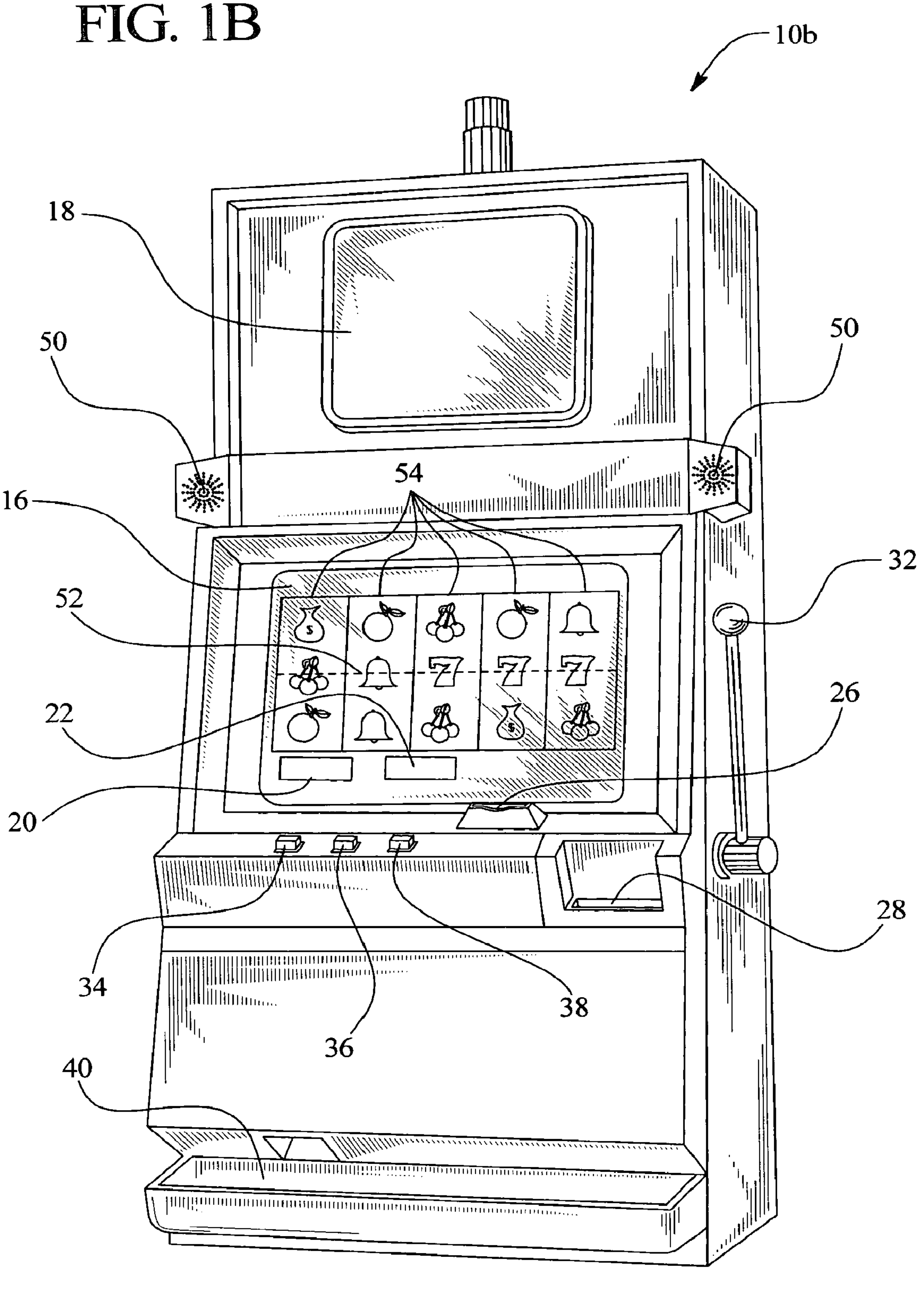
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
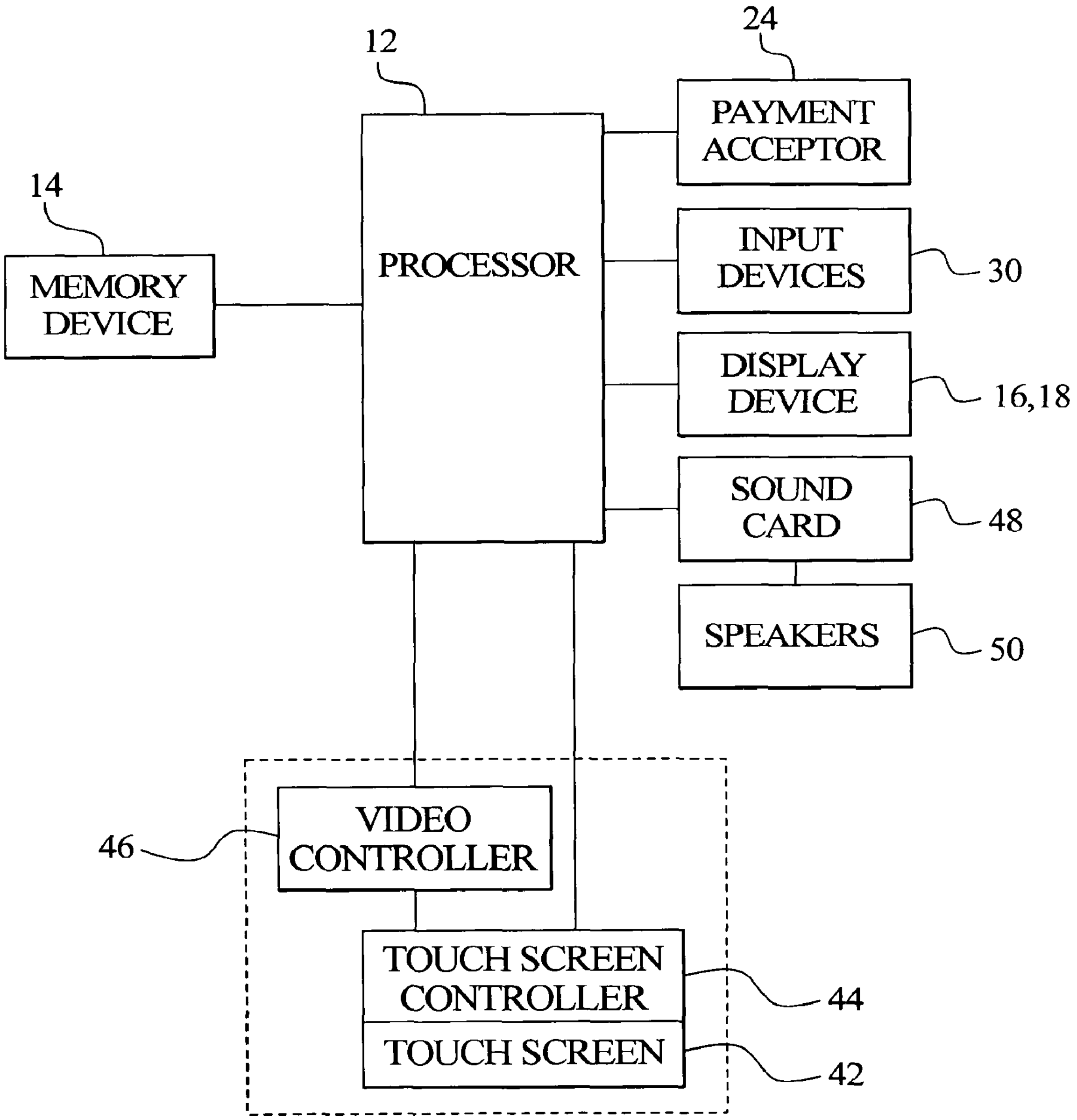
FIG. 2A is a schematic block diagram of one embodiment of an electronic configuration for one of the gaming devices of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "brain box."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touchscreen with an associated touchscreen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which moves one or more mechanical objects, such as one or more mechanical rotatable wheels or reels that each display at least one image, symbol or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment.

In one embodiment, a player may insert an identification card into a card reader 60 of gaming device 10. Card reader 60 is operable with a dedicated keypad 62 or a keypad appearing on display device 16, 18, which cooperates with touch screen 42 and touch screen controller 44 to enable the player to enter passwords, process fund requests, cancel fund requests and the like.

The identification card can be a smart card having a programmed microchip or a magnetic strip coded with a player's identification, credit totals and other relevant information. In one embodiment, money may be transferred to a gaming device through electronic funds transfer. When a player funds gaming device 10, the processor determines the amount of funds entered and the corresponding amount is shown on the credit or other suitable display as described above. Card reader 60 alternatively or additionally accepts payment cards, such as credit cards or debit cards. Card reader 60 in one embodiment includes a magnetic strip reader as is known to those of skill in the art.

As seen in FIGS. 1A, 1B and 2A, in one embodiment gaming device 10 includes at least one and preferably a plurality of input devices 30 in communication with the processor. The input devices can include any suitable device which enables the player to produce an input signal which is read by the processor. In one embodiment, after appropriate funding of gaming device 10, the input device is a game activation device, such as a pull arm 32 or a play button 34 which is used by the player to start any primary game or sequence of events in gaming device 10. The play button can be any suitable play activator such as a bet one button, a max bet button or a repeat the bet button. In one embodiment, upon appropriate funding, gaming device 10 begins the game play automatically. In another embodiment, upon the player engaging one of the play buttons, gaming device 10 automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with gaming device 10.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touchscreen 42 coupled with a touchscreen controller 44, or some other touch-sensitive display overlay to allow for player interaction with the images on the display. The touchscreen and the touchscreen controller are connected to a video controller 46. A player can make decisions and input signals into gaming device 10 by touching the touchscreen at the appropriate places.

Gaming device 10 may further include a plurality of communication ports for enabling communication of the processor with external peripherals, such as external video sources, expansion buses, game or other displays, an SCSI port or a key pad.

In one embodiment, as seen in FIG. 2A, gaming device 10 includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of gaming device 10, such as an attract mode. In one embodiment, gaming device 10 provides dynamic sounds coupled with attractive multimedia images displayed on one or more of the display devices to provide an audio-visual representation or to otherwise display full-motion video with sound to attract players to gaming device 10. During idle periods, gaming device 10 may display a sequence of audio and/or visual attraction messages to attract potential players to gaming device 10. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using gaming device 10 and/or the surrounding area of gaming device 10. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, gaming device 10 displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with gaming device 10. In this embodiment, gaming device 10 awards prizes when the reels of the primary game stop spinning if specified types and/or configurations of indicia or symbols occur on an active pay line or otherwise occur in a winning combination or pattern.

As seen below in FIGS. 6 to 14 display devices 16 or 18 display a plurality of reels 54*a* to 54*e* (collectively reels 54). Reels 54 operate with five paylines 52*a* through 52*e* (collectively paylines 52). In addition to credit display 20, bet display 22 and play button 34, display device 16 or 18 also displays the number of lines played in display 64, as well as the bet per line in display 66. Further, gaming device 10 provides input devices 30*a* and 30*b* that enable the player to change the number of lines wagered and bet per line, respectively. Display device 16 or 18 also provides a spins remaining meter 68, the function of which is described below.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, gaming device 10 includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
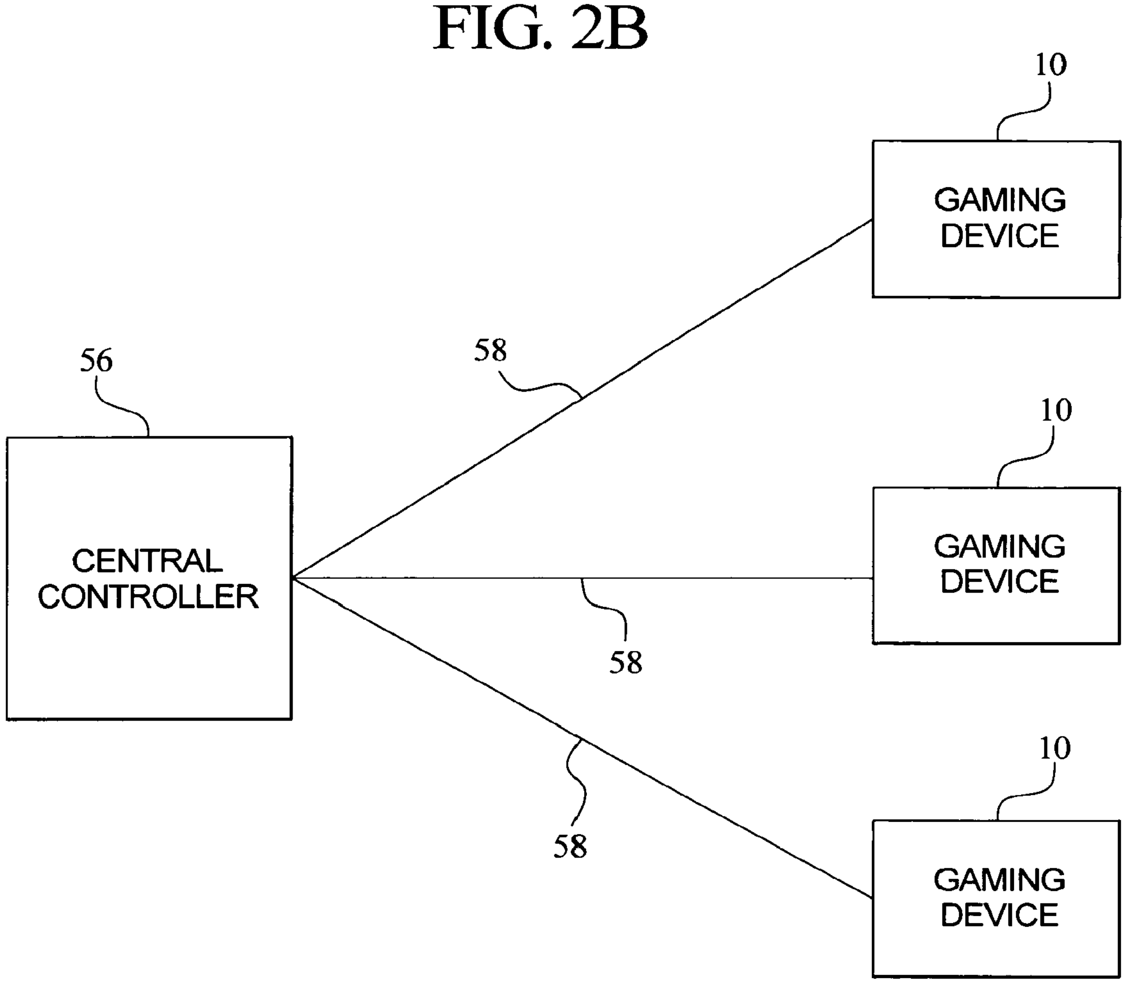
FIG. 2B is a schematic block diagram of one embodiment of a network configuration for a plurality of gaming devices of the present invention.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of gaming device 10.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. Gaming device 10 receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of gaming device 10 can be viewed at the gaming device with at least one internet browser. In this embodiment, operation of gaming device 10 and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

Free Spin Game with Changing Wild Symbols

Figure 3:
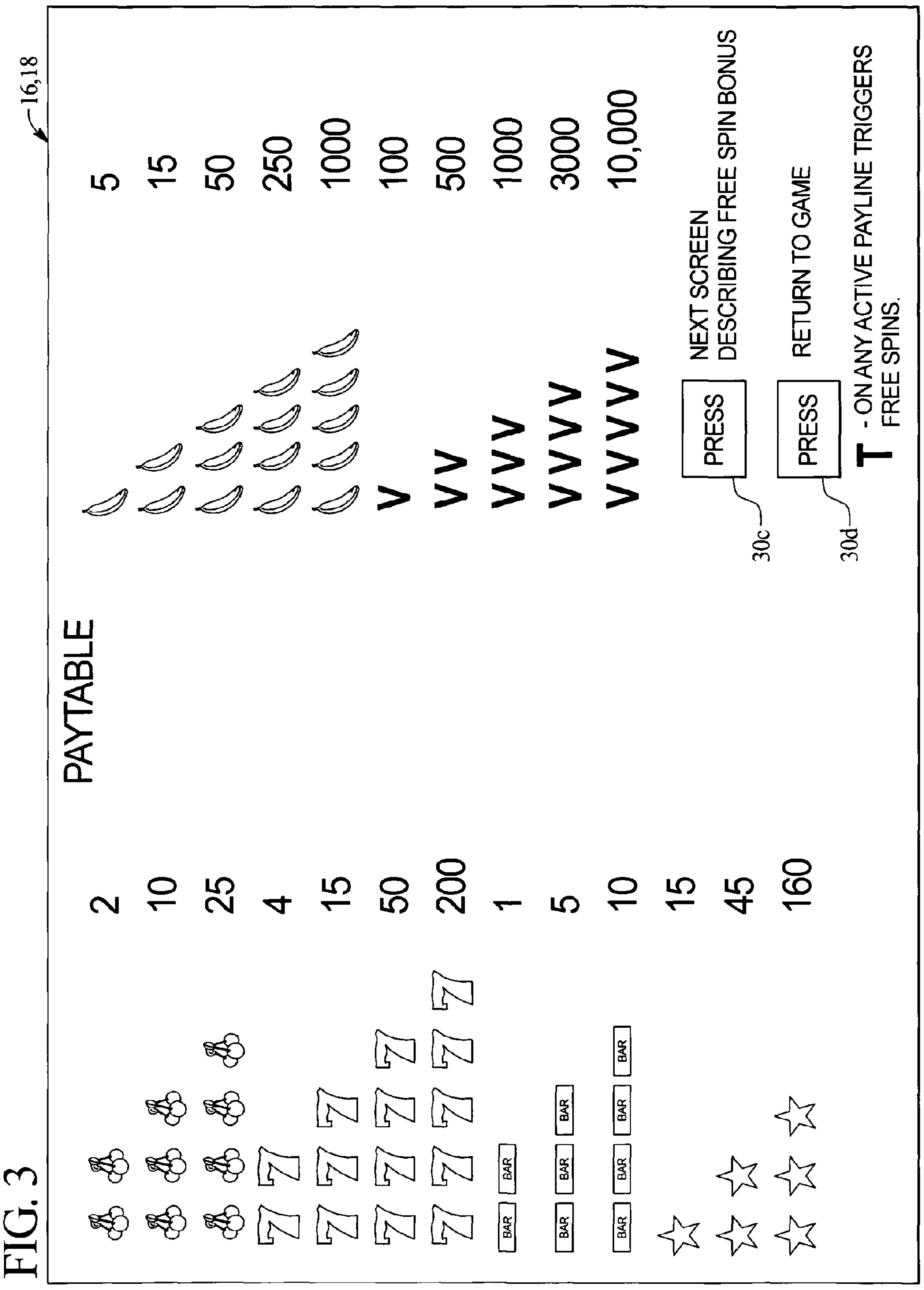
FIG. 3 is an elevation view of one of the display devices of the gaming machine showing one example of a paytable used in connection with the free spin game of the present invention.

Referring now to FIG. 3, one of the display devices 16 or 18 displays one embodiment of part of a paytable of the present invention. The paytable sets forth winning symbols and winning symbol combinations as well as the number of credits paid to the player for achieving such symbol or combination. The amount of credits paid corresponds a particular symbol or combination of symbols which can appear on the reels 54. For example, two bars as illustrated pays one credit, while a single "V" symbol pays 100 credits. The "V" symbol is less likely to appear on reels 54 than the bar symbols.

The paytable illustrates that certain symbols, such as the star, banana, and "V" symbols provide a payout for a single appearance of the symbol on the leftmost reel. The winning combinations in general begin from the left side of the reels and extend incrementally towards the right side of the reels. This feature is common among gaming machines and is important to the present invention in one embodiment illustrated below. The paying symbols alternatively appear at any desired locations along the reels.

In one embodiment, a symbol or symbol combination triggers the wild symbol and free spin operation of the present invention. In the illustrated paytable, the symbol "T" appearing on an active payline triggers the free spin bonus of the present invention. Alternatively, the triggering symbol need not appear on an active payline. Further, the triggering of the free spin game could have different or additional requirements, such as requiring: (i) the player's wager or a component thereof to be at a certain level such as max bet; (ii) that the player have played at least a certain number of games; (iii) have wagered a certain amount; (iv) have lost a certain amount; (v) a combination of triggering symbols and so on. The winning symbols and symbol combinations, as well as the illustrated credit amounts, are used below in the following examples that highlight the features and advantages of the present invention.

Gaming device 10 provides a number of free spins to the player. The number of spins provided can depend on different events, such as: (i) being predetermined, (ii) being randomly determined; (iii) being dependent upon the number of lines played; (iv) being dependent upon the bet per payline; (v) being dependent upon the total bet; (vi) being dependent upon a base game outcome; (vii) being dependent on the triggering symbol or triggering symbol combination; or (viii) any combination thereof. FIG. 3 also includes an input 30*c* enabling the player to view a Free Spin screen or an input 30*d* enabling the player to resume gaming.

Figure 4:
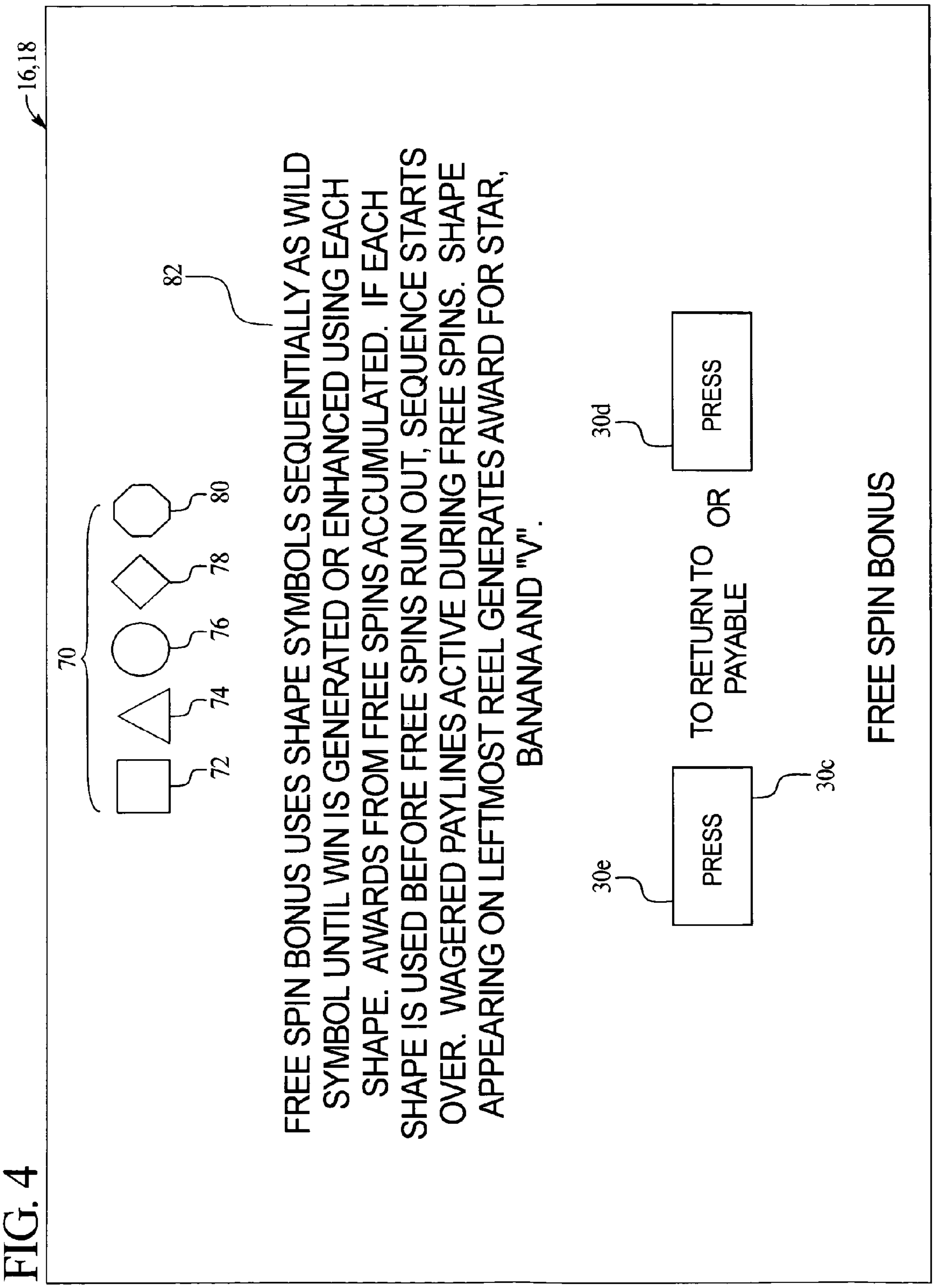
FIG. 4 is an elevation view of one of the display devices of the gaming machine showing one example of a free spin bonus explanation screen used in connection with the free spin game of the present invention.

FIG. 4 illustrates a separate screen of one of the display devices 16 or 18 that explains various features of the free spin game of the present invention. The wild symbols 72, 74, 76, 78 and 80 of the set 70 of the present invention function as at least one and in one embodiment each of the paying symbols of the paytable, namely, the cherry, "7", bar, star, banana and "V" symbols. The symbols of set 70 as well as the symbols of the paytable of FIG. 3 are merely examples. Other or different symbols may alternatively be employed. In one embodiment, as illustrated, the wild symbols of set 70 are visually related to one another, e.g., are all shapes. Alternatively, the symbols of set 70 are related people, animals, places, and the like.

As seen in FIG. 4, visual message 82 explains generally the parameters of one embodiment of the free spin game of the present invention to the player. Message 82 specifies that the free spin bonus uses shape symbols 72, 74, 76, 78 and 80 sequentially as wild symbols until, in each case, a win is generated or enhanced. The player accumulates awards as the sequence unfolds. If each shape is used in a win before the provided number of free spins expires, the wild symbol sequence starts over. Message 82 also specifies that only the wagered paylines are active during the free spins. Alternatively, each payline is active during the free spins regardless of whether the payline was activated in the base game. Further alternatively, only certain ones of the paylines are active during the free spins regardless of which paylines the player has played in the base game.

Message 82 also specifies that a shape 72, 74, 76, 78 or 80 acting as a wild symbol appearing in the leftmost reel on an active payline pays for each "single appearance" symbol of the paytable of FIG. 3, for example for the star, banana and "V" symbols shown in the paytable of FIG. 3. Such wild symbol appearances generate multiple wins when multiple "single appearances" paying symbol exist.

The free spin screen of FIG. 4 also provides the "return to game" input 30*d* and a "return to paytable" input 30*e*. The screens of FIGS. 3 and 4 are displayed in one embodiment in place of the reels shown in FIGS. 6 to 14. The touch screen operating with the display devices 16 and 18 enables the player to selectively call forth a desired screen to acquire desired information and then move back to the game screen to continue gaming.

FIGS. 3 and 4 illustrate wild symbol set 70 being separate from the base game paytable of FIG. 3. Alternatively set 70 is a sub-set of the paytable. That is, one or more or all of wild symbols 72 to 80 act as base game symbols of the paytable, wherein base game symbols 72 to 80 alone or in combination form one or more base game units for the player. For example, circle 74 could have the same pay structure as the cherry, "7," bar, star, banana or "V" symbols in the paytable of FIG. 3.

In another alternative embodiment, any of the symbols in the paytable of FIG. 3 could operate as wild symbols in the free spin sequence of the present invention. The present invention does not require a separate wild symbol set 70 or even a wild symbol sub-set as just previously described. Further, different free spin sequences may use different symbols as wild symbols. Moreover, all the symbols of the paytable of FIG. 3 could be used as wild symbols in the free spin sequence of the present invention. For ease of illustration the following examples employ a separate wild symbol set 70. The principles illustrated however apply to any of the wild symbol embodiments described herein.

Figure 5:
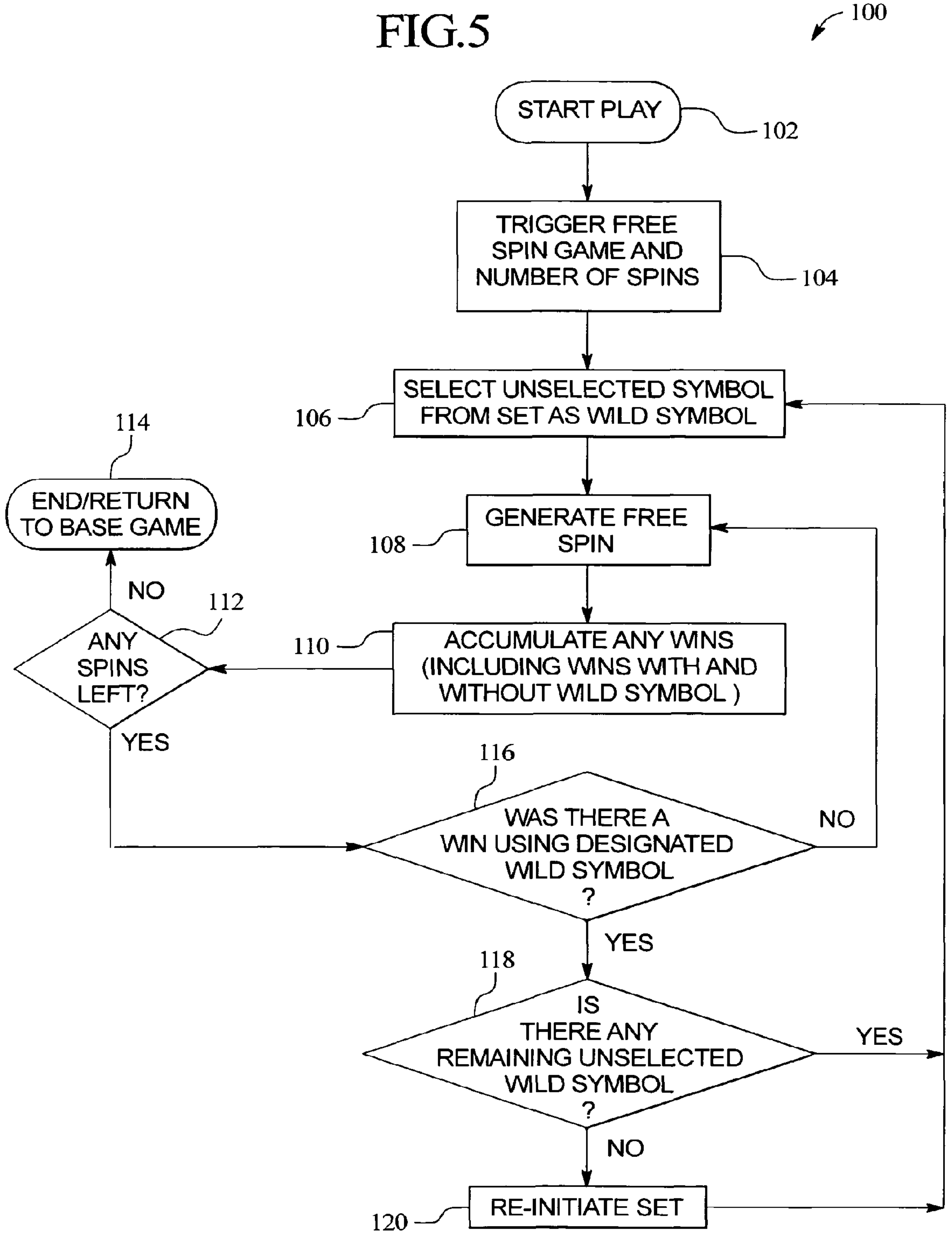
FIG. 5 is a schematic process flow diagram showing one embodiment of the method of the present invention.

Referring now to FIG. 5, one method 100 for operating the free spin bonus game of the present invention is illustrated schematically. Upon starting base game play, as indicated by oval 102, the player can trigger the free spin game of the present invention and a number of free spins as indicated by block 104. In one embodiment, a triggering symbol or combination, e.g., the "T" symbol, appearing on an active payline triggers the free spin bonuses. The various ways or factors in determining how many free spins the player achieves are discussed herein.

Upon triggering the free spin bonus, gaming device 10 selects one of the unselected symbols 72, 74, 76, 78 and 80 from set 70 to be set as the current wild symbol as indicated by block 106. In an embodiment, the wild symbol selection is random. Alternatively, the selection can occur in a predetermined order as discussed below. Gaming device 10 then generates a free spin as indicated by block 108. One example of the free spin bonus is illustrated below in FIGS. 6 to 14. During the initial free spin, the first symbol selected from the set is or functions as a wild symbol for any of the paying symbols of the paytable of FIG. 3.

The player accumulates any wins from the free spin generation as indicated by block 110. The credits accumulated in one embodiment includes those needing or not needing the current wild symbol. That is, the "7," "7," "7" combination may appear without the use of the current wild symbol. The player is paid for that winning combination and any other such combination appearing on an active payline, in one embodiment. Alternatively, the player is paid for such combinations appearing on any payline active or otherwise.

After the accumulation of any win from the free spin as shown in connection with block 110, gaming device 10 determines whether any free spins remain, as indicated by diamond 112. If no free spins remain, the free spin bonus ends and the player is allowed to return to the base game, as indicated by oval 114.

If there are free spins remaining, gaming device 10 determines whether the previous free spin has generated a win via the currently designated wild symbol, as indicated by diamond 116. If in the previous free spin the player did not generate a winning symbol or winning symbol combination or if the only winning symbol(s) or winning symbol combination(s) generated did not use the current wild symbol, the game generates a new free spin on reels using the same currently designated wild symbol, as indicated by block 108.

If the free spin generation generates a winning symbol or combination or enhances a winning combination using the currently designated wild symbol, gaming device 10 determines whether any symbols of set 70 remain unselected, as indicated by diamond 118. If remaining unselected symbols exist, e.g., for set 70, gaming device 10 selects a new unselected symbol as a next wild symbol, as indicated by block 106. The steps just described are then repeated.

If there are no remaining unselected symbols, as determined in connection with diamond 118, the symbol set is reinitiated, as indicated by block 120, after which a symbol is selected from the reinitiated set, as indicated by block 106. The sequence just described is repeated until eventually no free spins remain, as determined in connection with diamond 112, after which the player returns to the base game as indicated by oval 114. As discussed above, the random generations of the game described herein can be controlled locally at the gaming device or centrally by a remote server.

Method 100 describes a game that is controlled ultimately by the number of free spins provided to the player. In an alternative embodiment, the do-until nature of providing free spins until a win occurs controls the outcome of the game. That is, instead of determining whether any free spins remain, the game ends when each of the symbols of the set is used as a wild symbol in a paying outcome. The game can but does not have to reinitiate the set for a second sequence of free spins after each symbol of a first sequence is used. The do-until controlled game presents an interesting dynamic to the player, in which the player desires to achieve as many paying symbols and combinations during the free spins without the use of one of the wild symbols before obtaining a winning symbol or combination using each wild symbol.

The present invention includes a number of alternative embodiments to those illustrated by the sequence of FIG. 5. First, the selection of the next symbol to become wild shown in connection with block 106 may be done in a plurality of different ways. The next symbol to become wild may be chosen: (i) randomly, (ii) on a predetermined basis; (iii) based on a location that the symbol appears on the reels; (iv) based on a location that the next wild symbol appears in relation to another symbol, e.g., as it appears in relation to the current wild symbol (next wild symbol could appear directly adjacent to the current wild symbol in a "king of the hill" or professional wrestling "tag in/out" type of theme arrangement); (v) based on a proximity to a base game win (e.g., if a symbol of set 70 appears between two or more otherwise adjacent cherries, "7's", bars, stars, bananas or "V's", that symbol of set 70 is chosen to provide automatically a win to the player); or (vi) any combination thereof. In a further alternative embodiment, one or more symbols of set 70 may be made wild more than once during a given sequence. Also, two or more symbols of set 70 may be wild simultaneously.

Various alternatives exist for when the wild symbols change, which is described in connection with diamond 116. A wild symbol change may occur: (i) after a certain number of free spins (with or without a win); (ii) when another symbol randomly overtakes the current wild symbol (e.g., in accordance with a "king of the hill" or "tag in/out" wrestling theme); (iii) after a particular level of win (e.g., a number of credits); (iv) upon a player selection (e.g., player picks favorite wrestler); or (v) any combination thereof.

Referring now to FIGS. 6 to 14, one example of the free spin game of the present invention is illustrated. The reels, paylines, indicators and selectors described above are shown on one of the display devices 16 or 18. Display device 16 or 18 shows the total credit display 20 as well as spins remaining display 68.

Figure 6:
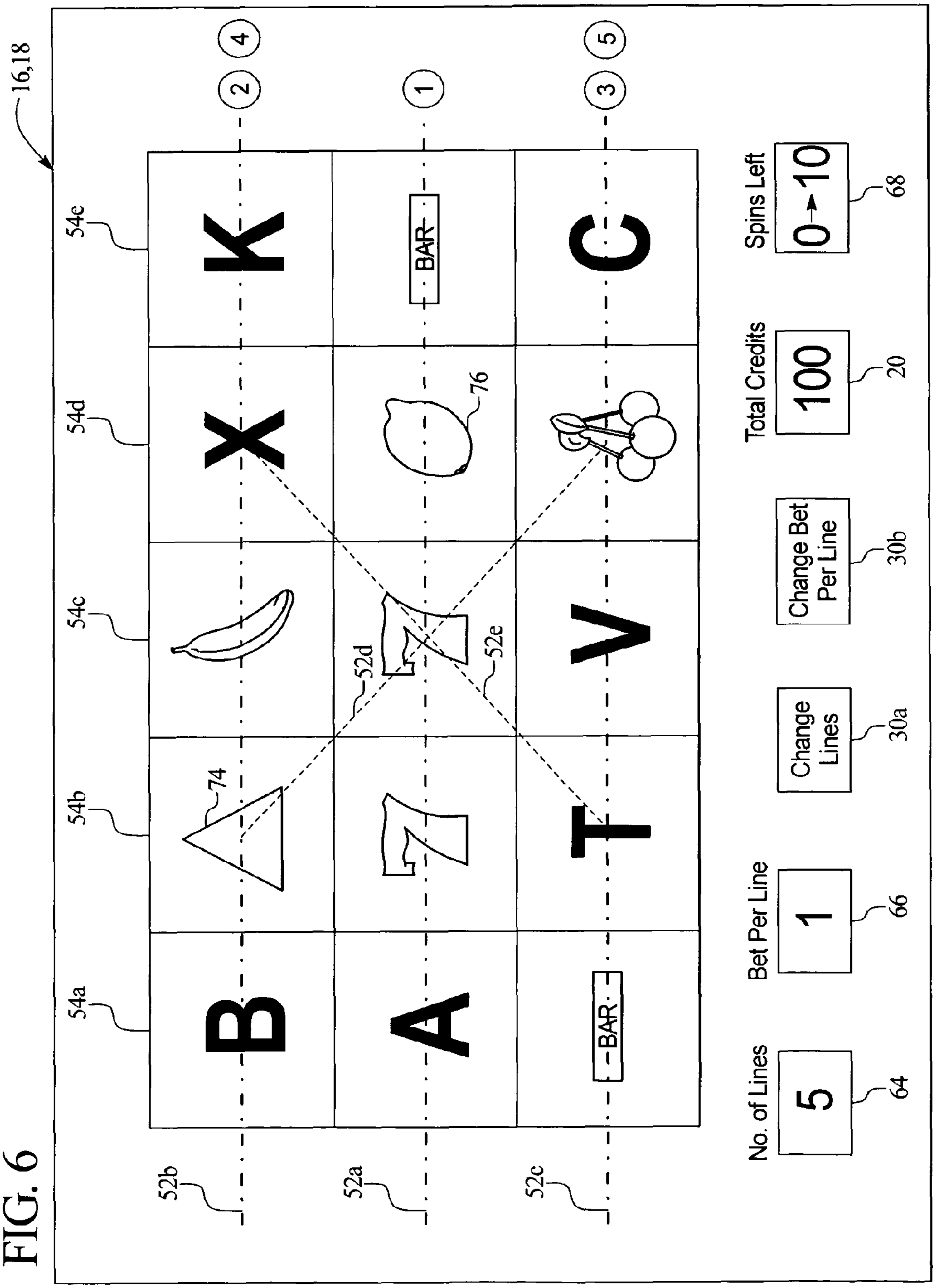
FIGS. 6, 7, 8, 9, 10, 11, 12, 13 and 14 are elevation views of one of the display devices of the gaming machine showing one example of the free spin sequence of the present invention.

FIG. 6 illustrates that the player playing the base game has a current total of one hundred credits and has just generated the free spin bonus of the present invention by generating the triggering "T" symbol on paylines lines 52*c* and 52*e*. The player is provided ten free spins as indicated by the incrementation of meter 68. Gaming device 10 arrives at ten free spins via any of the methods discussed above. In one implementation, the player is provided more free spins if the triggering symbol "T" lands on the active paylines, as here (52*c* and 52*e*) or if two or more triggering symbols "T" are generated.

Figure 7:
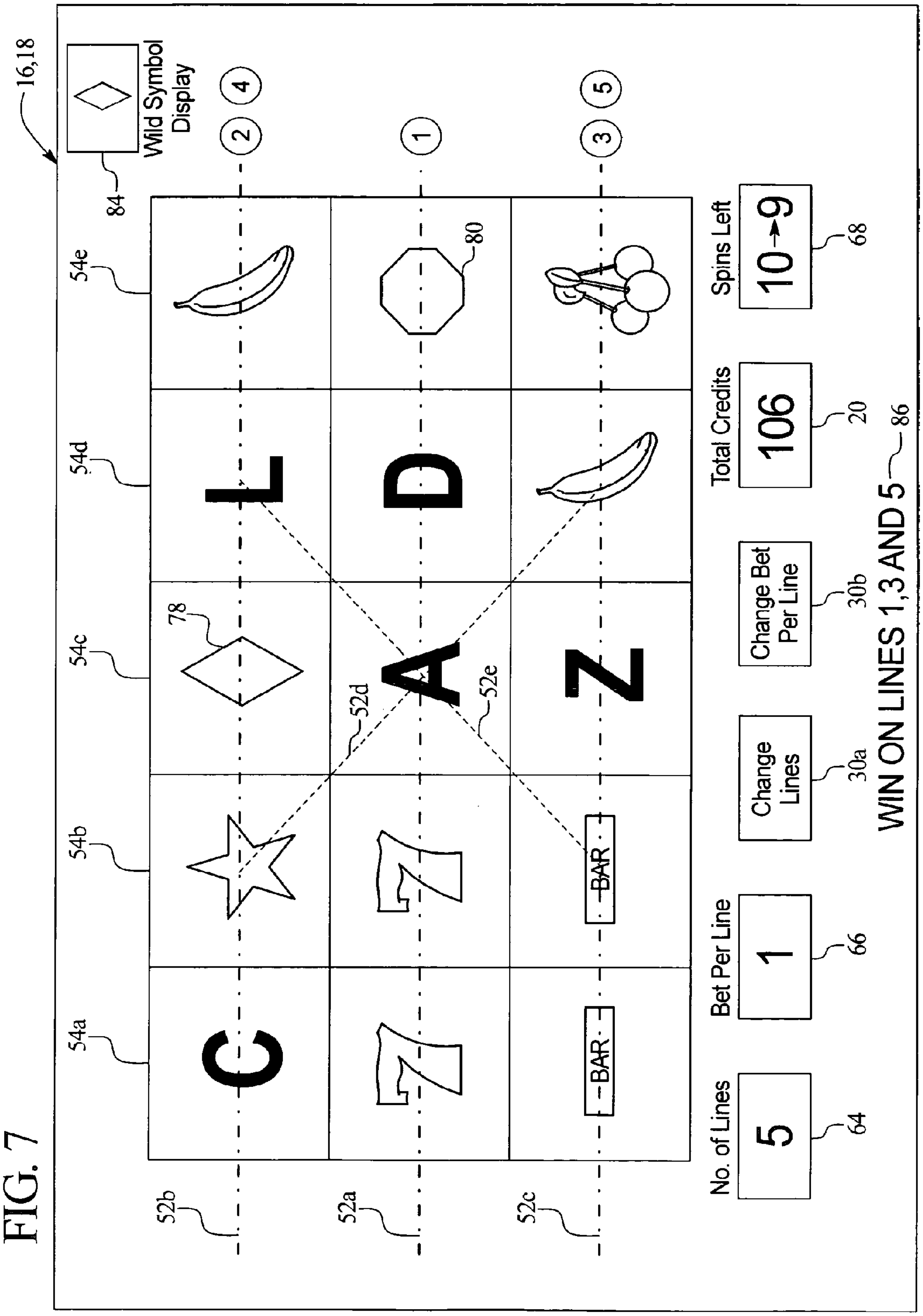

FIGS. 7 to 14 also illustrate a wild symbol display 84, which in one embodiment is selectively displayed when the player enters the free spin bonus. FIG. 7 shows the results of the first free spin. Spins remaining display 68 shows the remaining spins decrease from ten to nine. Wild symbol display 84 illustrates that the first of the symbols of set 70 to be set as the wild symbol is the diamond symbol 78. That is, diamond symbol 78 currently stands in the place of each winning or paying symbol showing the paytable of FIG. 3. Also, the remaining symbols 72, 74, 76 and 80 of set 70 are not currently wild.

As seen in FIG. 7, wild diamond symbol 78 is generated by the free spin along payline 52*b* and reel 54*c*. That symbol generation, however, does not in combination with the other symbols along payline 52*b* produce a winning symbol or winning combination of symbols. Accordingly, the next free spin also designates diamond symbol 78 as the current wild symbol. In FIG. 7, the player does, however, accumulate wins from the free spin, as indicated by audio, visual or audiovisual message 86. In particular, the player wins four credits for obtaining the "7-7" combination on payline 52*a* as well as two credits total for the "bar-bar" combination on paylines 52*c* and 52*e* (one credit for each "bar-bar" combination). The total payout for each of the three wins is six credits as is updated in total credit display 20.

Figure 8:
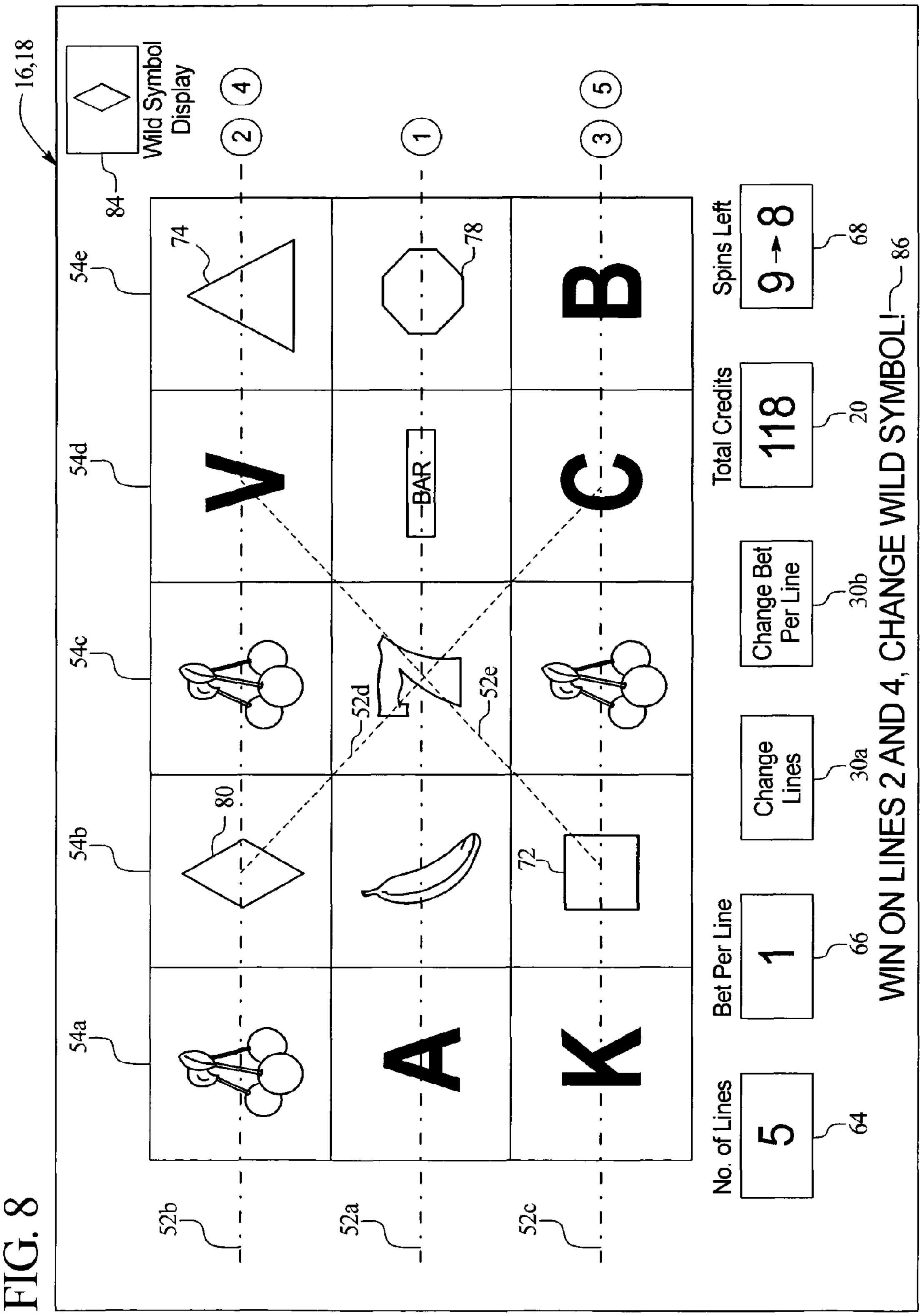

Referring now to FIG. 8, display device 16, 18 shows that a second free spin has been generated. Spins remaining display 68 accordingly shows the number of remaining spins changing from nine to eight. Wild symbol display 84 shows that for the second free spin, diamond symbol 78 is still the current wild symbol. Message 86 indicates that the player has generated wins on paylines 52*b* and 52*d* for the three and two cherry symbol combinations, respectively, resulting in a total win of twelve credits according to the paytable of FIG. 3. The player's total credits accordingly increases to one hundred eighteen as indicated by credit meter 20.

The win in FIG. 8 is caused by the generation of the wild symbol 78 at the top of reel 54*b*. Accordingly, message 86 also indicates that the wild symbol in the next subsequent free spin will change. In the illustrated embodiment, the square, triangle and octagon shape symbols 72, 74 and 80, respectively, generated in the free spin of FIG. 8 are not currently wild symbols and do not have the potential of creating a winning symbol or winning combination. In alternative embodiments, one or both of shape symbols 72 and 80 are part of the base game paytable of FIG. 3 and alone or in combination can provide a base game payout to the player.

Figure 9:
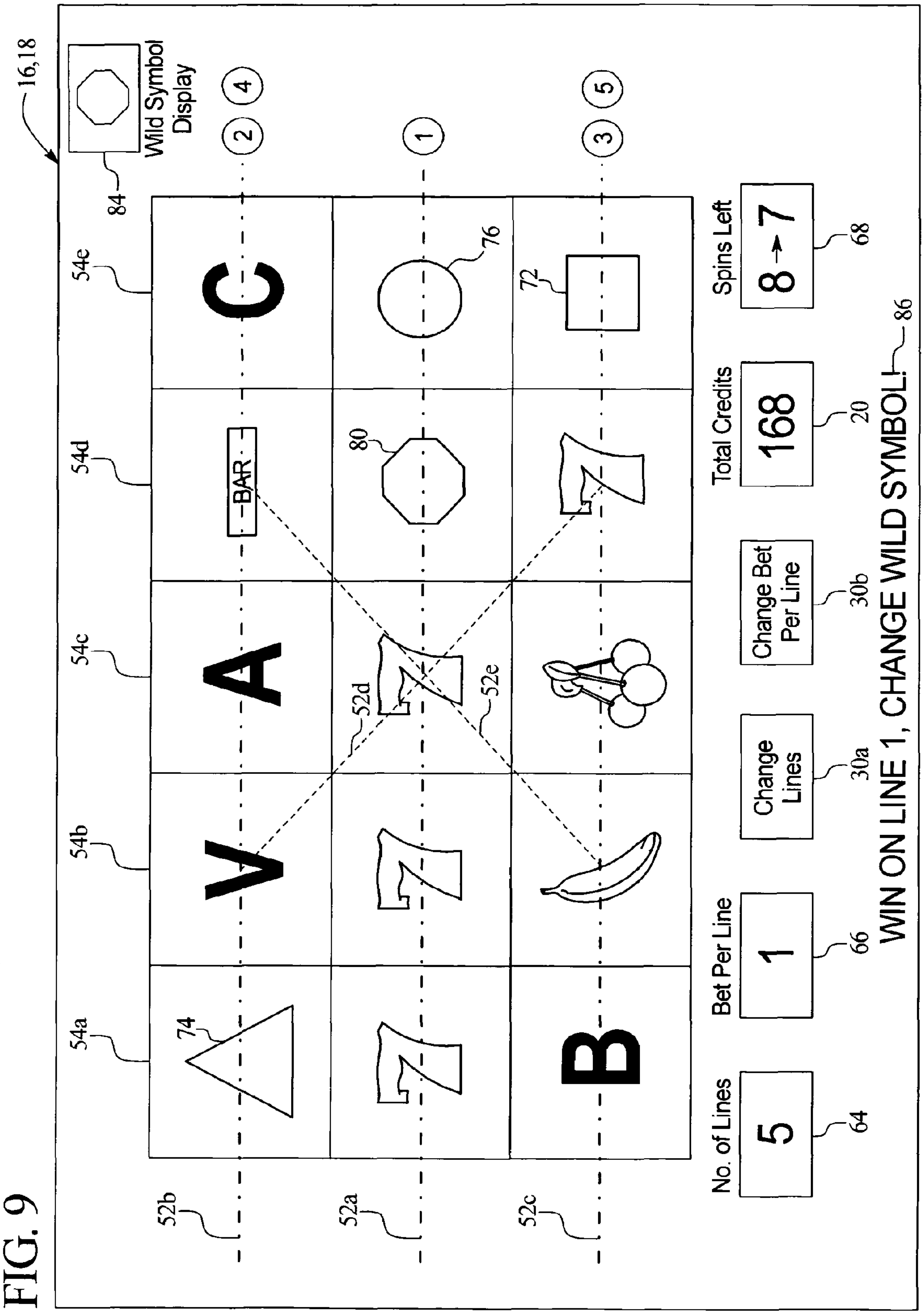

FIG. 9 illustrates on wild symbol display 84 that the new current wild symbol selected from set 70 is the octagon symbol 80. Gaming device 10 in one embodiment generates this new wild symbol randomly from the remaining unselected symbols from the set 70. In another embodiment, the wild symbols are chosen based on a predetermined order. It is also possible that a combination of such generation techniques is employed, e.g., wherein the wild symbols are generated randomly the first time through the free spin generation sequence, after which at least a portion of the randomly generated order is repeated if the player has remaining free spins.

The free spin generation outcome shown in FIG. 9 leaves the player with seven remaining free spins as indicated by meter 68. The current free spin has produced the octagon wild symbol 80 that increases the "three sevens" win to a "four sevens" win. According to the paytable of FIG. 3, the player wins fifty credits instead of fifteen, increasing the player's total credits to one hundred sixty eight as seen in credit display 20. Also, as indicated by message 86, the next free spin will employ a different symbol from set 70 as the wild symbol.

Figure 10:
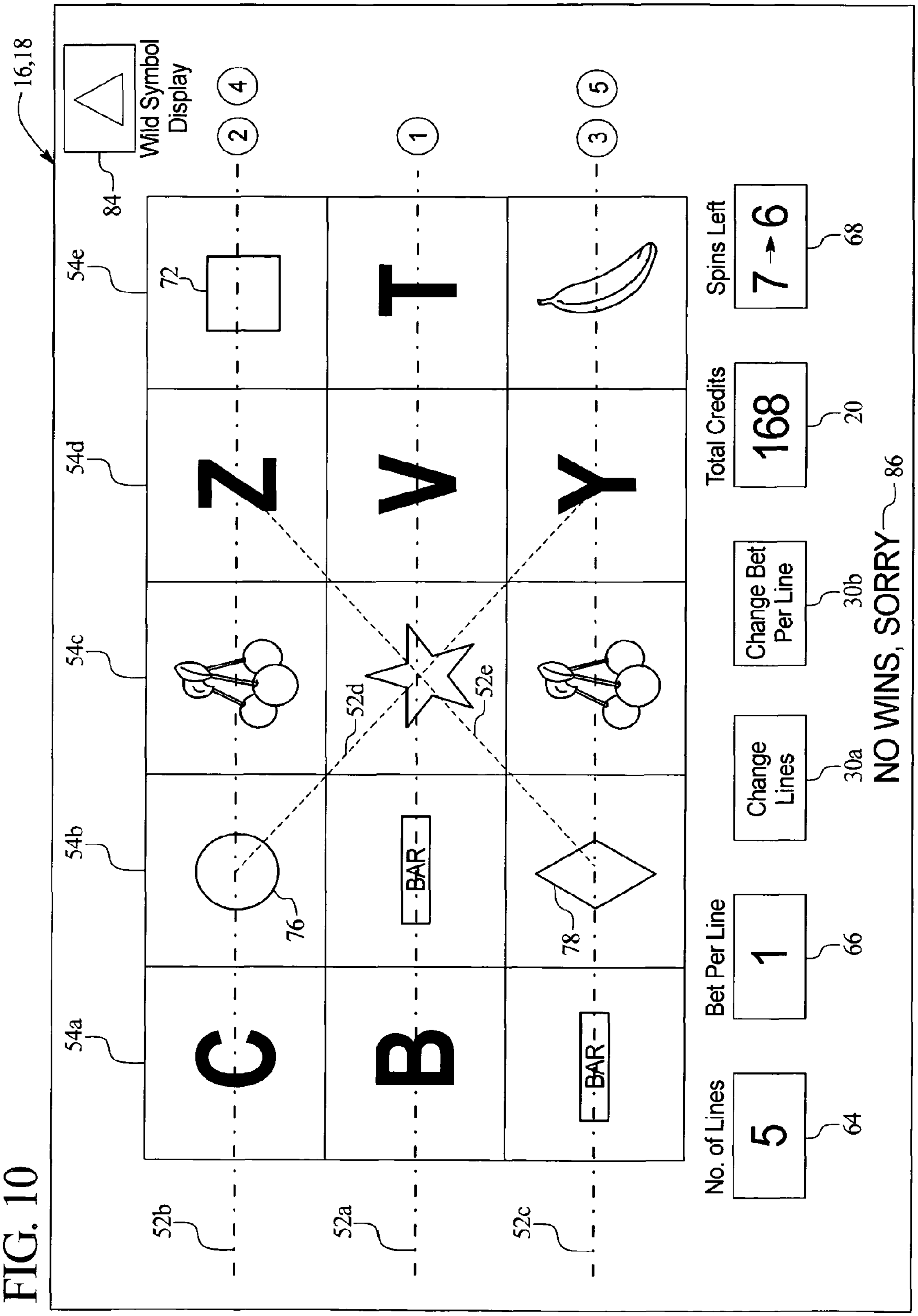

Referring now to FIG. 10, the current wild symbol from set 70 is the triangle symbol 74. The free spin generation of FIG. 10 shows that while two symbols of the set 70, namely, circle 76, diamond 78 and square 72 have been generated, none of those symbols are currently wild and no winning symbol or winning symbol combination occurs due to the generation, as indicated by message 86. The player's spins decrease from seven to six as indicated by meter 68.

Figure 11:
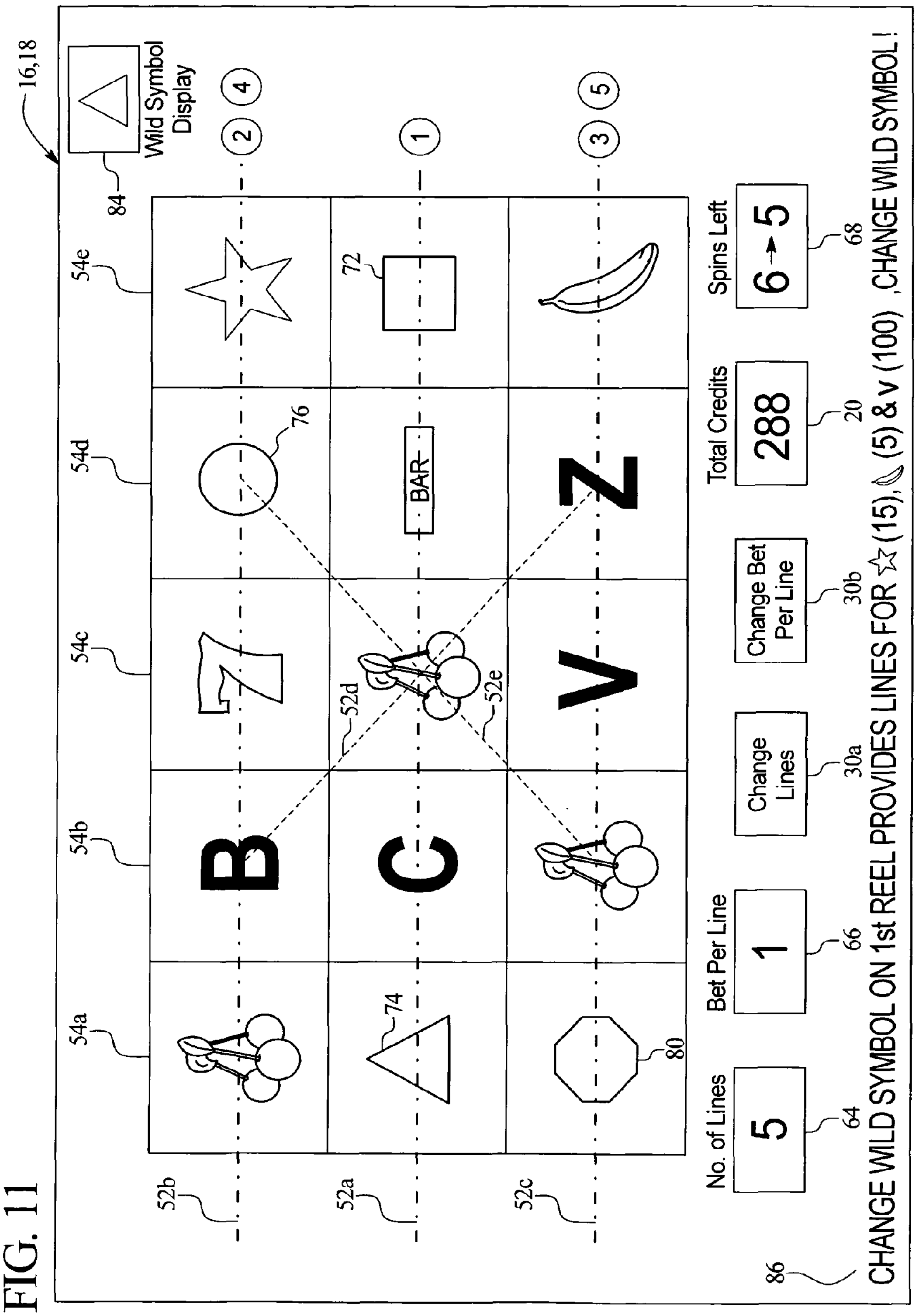

FIG. 11 illustrates that triangle symbol 74 is still the wild symbol, as indicated by meter 84. Message 86 indicates that the most recent spin has generated triangle symbol 74 on the left most reel. Triangle wild symbol 74 on the left most reel pays for all "single appearance" payouts of the paytable of FIG. 3. Here, wild symbol 74 generates three different wins, namely, fifteen credits for achieving the single star symbol, five credits for achieving the single banana symbol and one hundred credits for achieving the "V" symbol according to the paytable in FIG. 3. Those symbols as seen in FIG. 3 pay for a single occurrence on the left-most reel 54*a*. Accordingly, the wild symbol 74 appearing on the left most reel 54*a* stands in place of each of those "single appearance" symbols of the paytable and produces of each of the associated wins. In an alternative embodiment, only a highest payout of the multiple "single appearance" is provided to the player. For example, only the one hundred credits for the single "V" symbol is provided to the player.

No other wins are generated in the free spin outcome shown in FIG. 11. The spins remaining meter reduces from six to five as seen in meter 68. The player's total credits increase by one hundred twenty to two hundred eighty-eight as seen in total credit display 20. Message 86 also indicates that the next free spin will employ a new one of the symbols as the wild symbol.

Figure 12:
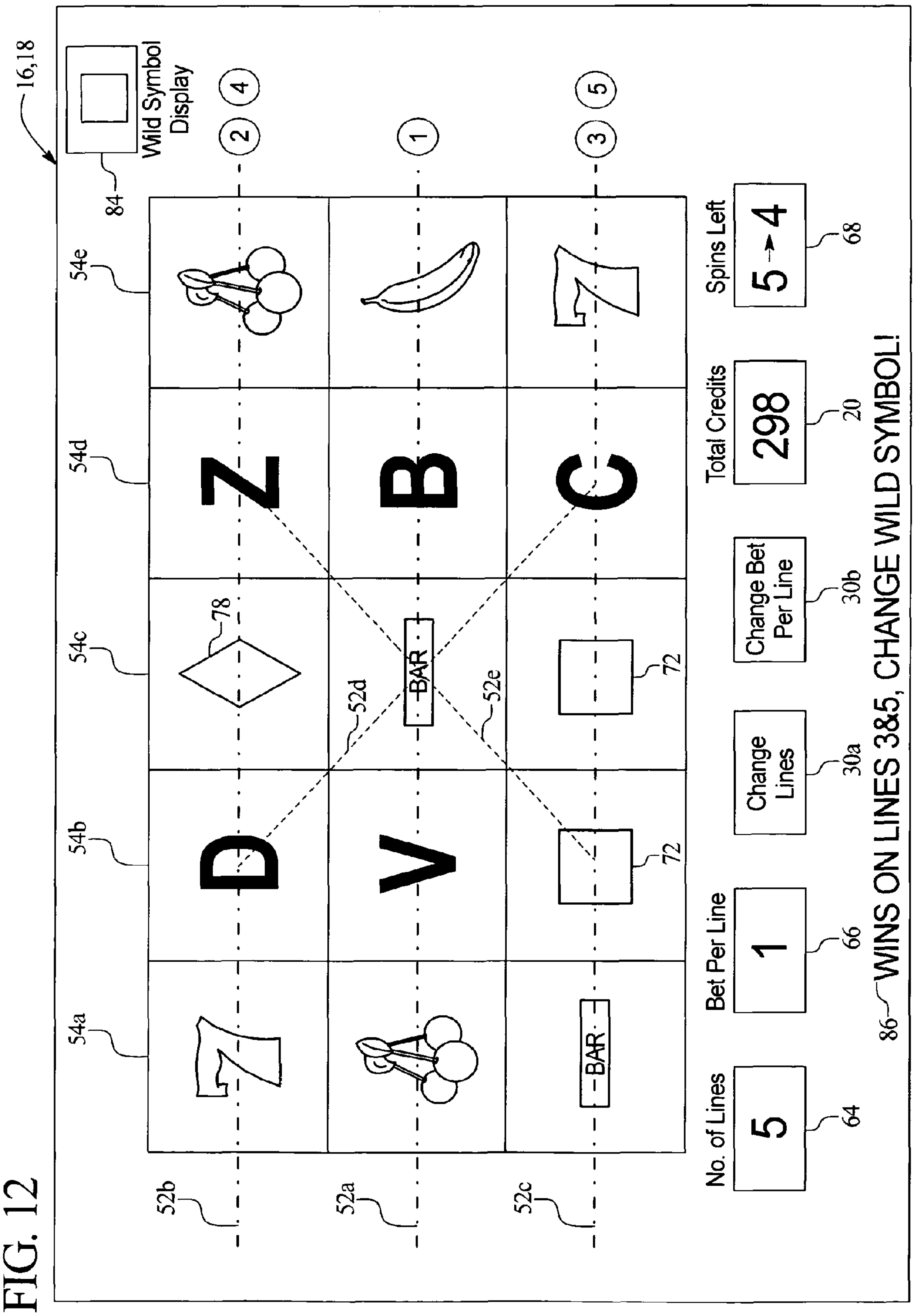

Wild symbol display 84 in FIG. 12 shows that the square symbol 72 is selected as the new current the wild symbol. The free spin outcome illustrated in FIG. 12 generates two square symbols 72 along payline 52*c* and one square symbol 72 along payline 52*e*. The spins remaining as seen in meter 68 reduces from five to four. The player wins on both paylines 52*c* and 52*e*, which increases the player's total credits to two hundred ninety eight as shown in credit display 20.

FIG. 12 illustrates that the wild symbols of the present invention can be generated adjacent to each other and operate collectively to increase the overall winning combination. Here, the two square wild symbols 72 in combination with the bar symbol yield a win of five credits for three bars occurring along reel 52*c*. Also, the player wins five credits for the three bar symbols appearing on payline 52*e* due to the additional bar symbol on the central play stop.

Figure 13:
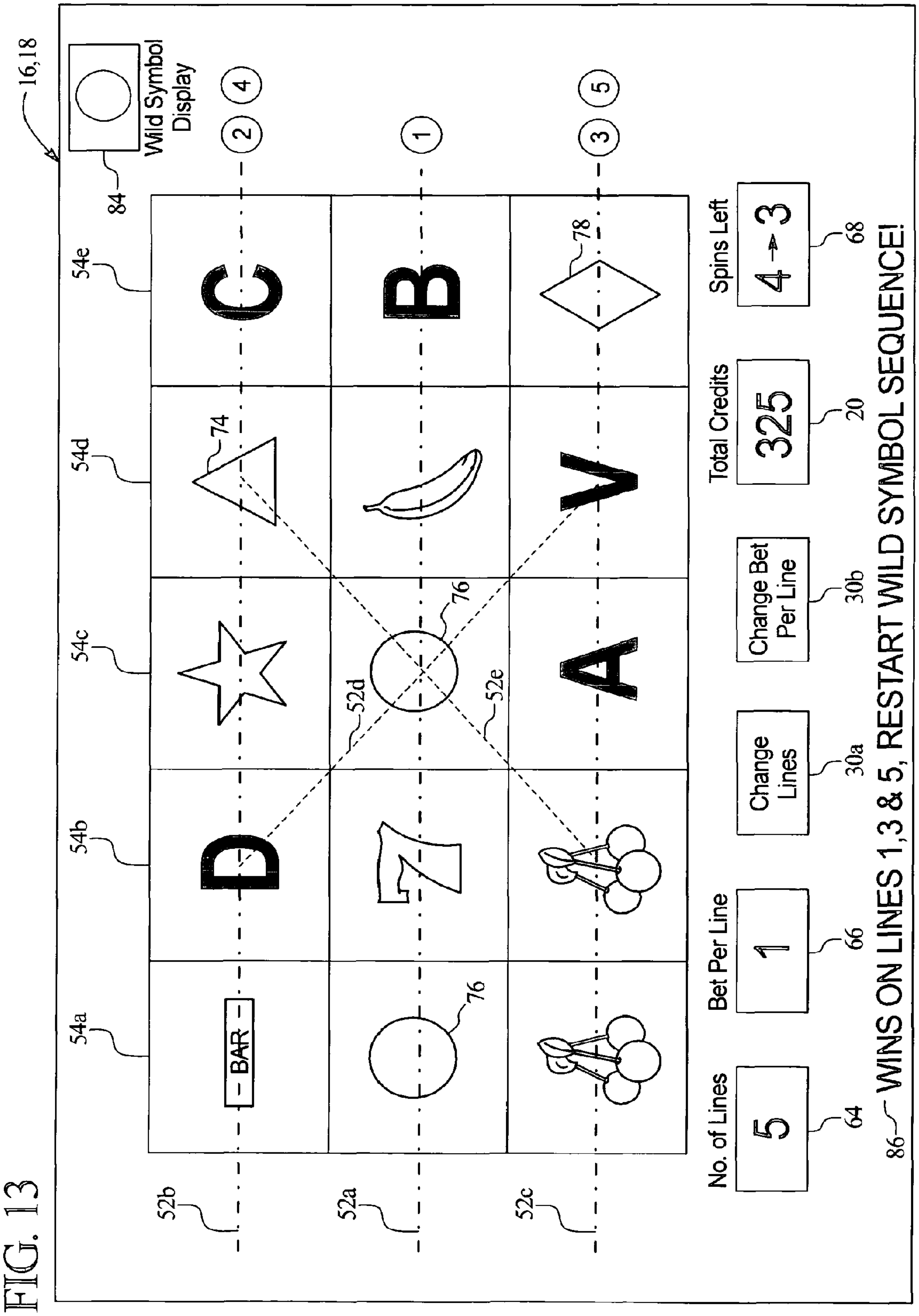

FIG. 12 indicates that the next free spin will use a new wild symbol, which will be the final and remaining unselected wild symbol. Wild symbol display 84 of FIG. 13 shows that the current wild symbol is selected by process of elimination to be the circle 76. The circle 76 appears on reels 54*a* and 54*c* along payline 52*a* in the free spin generation of FIG. 13. The player wins for three sevens on payline 52*a*. Also, a pair of cherries appears on paylines 52*c* and 52*e*. The wild symbol 76 appearing on the middle pay stop of reel 54*c* also increases the win to a three cherry win along payline 52*e*. The player accumulates twenty seven total credits for each of the three wins, increasing the player's total to three hundred twenty five. The player has three free spins remaining after the generation of FIG. 13. Message 86 indicates that the wild symbol sequence will be repeated or restarted for the remaining three free spins. In alternative embodiments, a new number of free spins is also provided. For example, the player can receive ten new free spins. The player recycles or regenerates the free spin sequence if each of the wild symbols of set 70 produces a win for the player.

Figure 14:
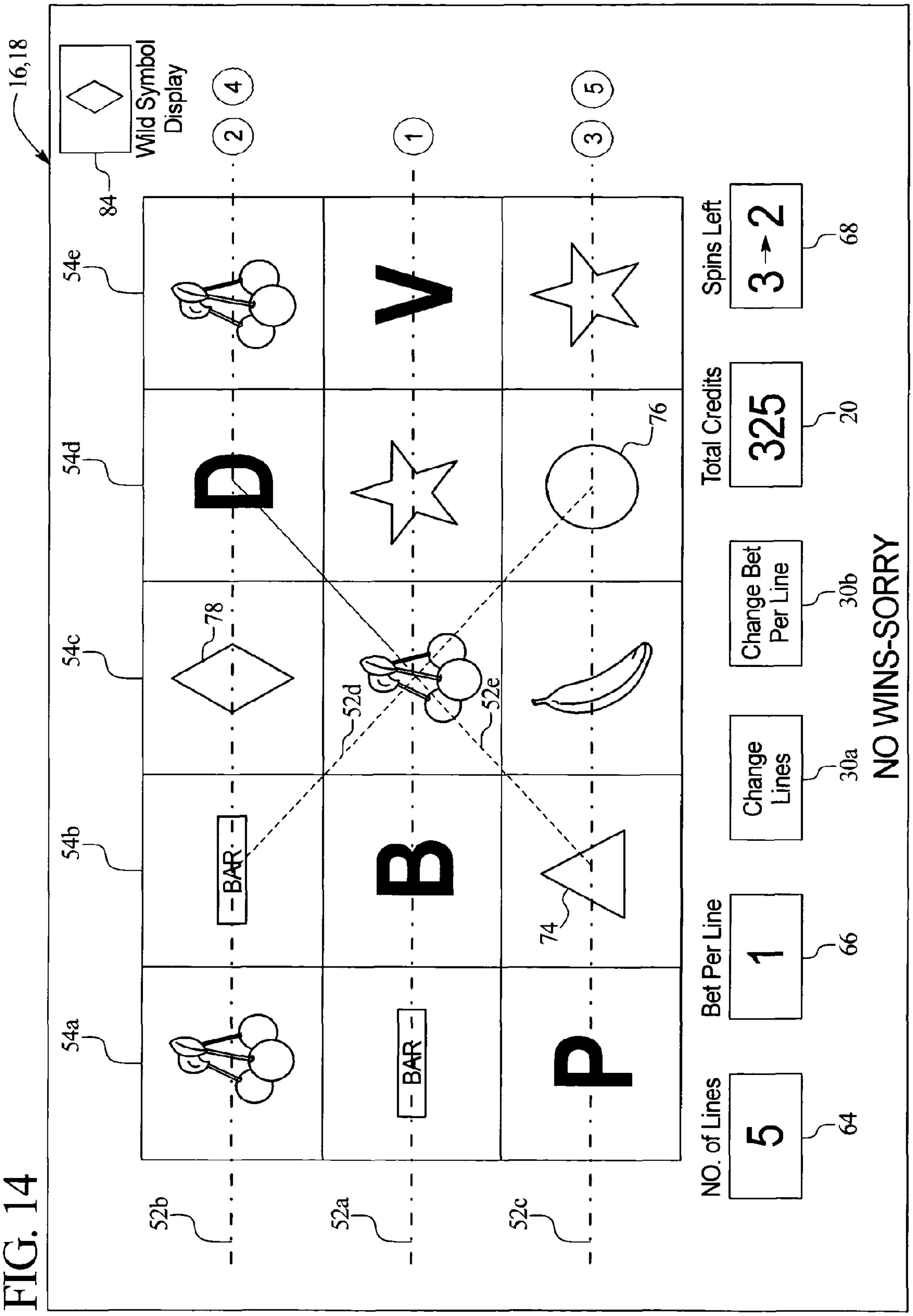

Wild symbol display 84 of FIG. 14 shows that the sequence begins again with the diamond symbol 78. Diamond symbol 78 is generated along payline 52*b* in FIG. 14 but does not yield a win for the player. Indeed, the player does not generate a winning outcome in FIG. 14. The example of FIG. 14 illustrates that the sequence is repeated in the previously established order when the player has spins remaining and the last of the symbols of set 70 is used in a winning combination or as a winning symbol. As discussed above, alternatively the symbols are again generated randomly and in a potentially different order when the symbol selection sequence just described is repeated.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between gaming device 10 hardware and software and the host site computer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) enable a player to make a wager on a play of a game, said game having a plurality of reels including a plurality of symbols, each of said reels including at least one of said symbols; and (b) for said play of the game:

(i) display a first series of free spins of the reels, wherein a first symbol of the plurality of symbols functions as a wild symbol for said first series of free spins of the reels, such that said first symbol functions as at least one other symbol of the plurality of symbols for said first series of free spins of the reels, and wherein the free spins of the reels of the first series are sequentially displayed until said first symbol in combination with other generated symbols results in one of a plurality of awards for the player a predetermined number of times, said predetermined number being at least one, (ii) for each free spin sequentially displayed in the first series of free spins of the reels, provide one of said plurality of awards for each winning symbol combination which occurs in said free spin, regardless of whether or not said winning symbol combination includes the first symbol, and (iii) after said first symbol in combination with other generated symbols results in one of the plurality of awards for the player the predetermined number of times, automatically display a second series of at least one free spin of the reels, wherein a second different symbol of the plurality of symbols functions as a wild symbol for said second series of at least one free spin of the reels, such that said second different symbol functions as at least one other symbol of the plurality of symbols for said second series of at least one free spin of the reels.

2. The gaming system of claim 1, wherein the plurality of instructions, when executed by the at least one processor, cause the at least one processor to operate with the at least one display device to display a third series of at least one free spin of the reels, wherein a third different symbol of the plurality of symbols functions as a wild symbol for said third series of at least one free spin of the reels.

3. The gaming system of claim 2, wherein the plurality of instructions, when executed by the at least one processor, cause the at least one processor to operate with the at least one display device to display a repeat of at least one of the first series, second series and third series.

4. The gaming system of claim 3, wherein the plurality of instructions, when executed by the at least one processor, cause the at least one processor to operate with the at least one display device to display the repeat after each of a set of designated symbols functions as a wild symbol and, in combination with other generated symbols, results in one of the plurality of awards in at least one free spin.

5. The gaming system of claim 4, wherein the symbols that function as wild symbols include: (i) a sub-set of a payable; or (ii) each of the symbols of said paytable.

6. The gaming system of claim 1, wherein the first symbol does not function as a wild symbol in the second series of at least one free spin.

7. The gaming system of claim 1, wherein the first symbol and the second symbol are different from the symbols of a paytable.

8. The gaming system of claim 1, wherein the first symbol and the second symbol are part of a paytable.

9. The gaming system of claim 1, wherein the plurality of instructions, when executed by the at least one processor, cause the at least one processor to choose the second symbol to function as a wild symbol: (i) randomly; (ii) based on a preset sequence of wild symbols; (iii) based on a position on the reels upon which the second symbol is generated; (iv) based on a spatial relationship on the reels between the second symbol and the first symbol; (v) based on a spatial relationship on the reels between the second symbol and a third symbol of the plurality of symbols; or (vi) based on a spatial relationship on the reels between the second symbol and a combination of symbols from a paytable.

10. The gaming system of claim 1, wherein the plurality of instructions, when executed by the at least one processor, cause the at least one processor to select the first and second symbols to function as wild symbols based on a predetermined sequence of wild symbols.

11. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) enable a player to place a wager on a play of a game, said game having a plurality of reels, each of the reels including at least one of a plurality of symbols; and (b) for said play of the game:

(i) display a first series of free spins of the reels, wherein a first symbol of the plurality of symbols functions as a wild symbol, such that said first symbol represents at least one other symbol of the plurality of symbols for said first series of free spins of the reels, and wherein the free spins of the first series are sequentially displayed until said first symbol is included in at least one of a plurality of winning outcomes a predetermined number of times, said predetermined number being at least one, (ii) for each free spin sequentially displayed in the first series of free spins, provide one of a plurality of awards for each winning outcome which occurs in said free spin, regardless of whether or not said winning outcome includes the first symbol, and (iii) after said first symbol of said first series is included in at least one of the winning outcomes the predetermined number of times, display a second series of at least one free spin of the reels, wherein a second symbol of the plurality of symbols functions as a wild symbol such that said second symbol represents at least one other symbol of the plurality of symbols for said second series of at least one free spin of the reels.

12. The gaming system of claim 11, wherein the first symbol does not function as a wild symbol in the second series of at least one free spin.

13. The gaming system of claim 11, wherein the first and second symbols are different from the symbols of a paytable.

14. The gaming system of claim 11, wherein the plurality of instructions, when executed by the at least one processor, cause the at least one processor to choose the second symbol to function as a wild symbol: (i) randomly; (ii) based on a preset sequence of wild symbols; (iii) based on a position on the reels upon which the second symbol is generated; (iv) based on a spatial relationship on the reels between the second symbol and the first symbol; (v) based on a spatial relationship on the reels between the second symbol and a third symbol of the plurality of symbols; or (vi) based on a spatial relationship on the reels between the second symbol and a combination of symbols from a paytable.

15. The gaming system of claim 11, wherein the plurality of instructions, when executed by the at least one processor, cause the at least one processor to select the first and second symbols to function as wild symbols based on a predetermined sequence of wild symbols.

16. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) enable a player to place a wager on a play of a game, said game having a plurality of reels, each of said reels including at least one of a plurality of symbols; and (b) for said play of the game:

(i) cause a first symbol of the plurality of symbols to function as a wild symbol in a first series of free spins of the plurality of reels, such that said first symbol functions as at least one other symbol of the plurality of symbols for said first series of free spins of the reels, until the first symbol, functioning as the wild symbol, is generated as part of at least one of a plurality of winning symbol combinations of a paytable a predetermined number of times, said predetermined number being at least one, (ii) for each free spin of the first series of free spins, provide one of a plurality of awards for each winning symbol combination of the paytable which occurs in said free spin, regardless of whether or not said winning symbol combination includes the first symbol, and (iii) after said first symbol is generated as part of at least one of the winning symbol combinations of the paytable the predetermined number of times, automatically cause a second different symbol to function as the wild symbol in a second series of free spins of the plurality of reels, such that said second different symbol functions as at least one other symbol of the plurality of symbols for said second series of free spins, until the second symbol, functioning as the wild symbol, is generated as part of at least one winning symbol combination of the paytable.

17. The gaming system of claim 16, wherein the plurality of instructions, when executed by the at least one processor, cause the at least one processor to cause each of a plurality of designated symbols to function as the wild symbol in separate series of free spins until each of the plurality of designated symbols is generated as part of at least one of the winning symbol combinations of the paytable.

18. The gaming system of claim 16, wherein the plurality of instructions, when executed by the at least one processor, cause the at least one processor to operate with the at least one display device to accumulate and display any awards for the player from the first series and second series of free spins.

19. The gaming system of claim 16, wherein the plurality of instructions, when executed by the at least one processor, cause the at least one processor to select the second symbol to function as a wild symbol: (i) randomly; (ii) based on a preset sequence of wild symbols; (iii) based on a position on the reels upon which the second symbol is generated; (iv) based on a spatial relationship on the reels between the second symbol and the first symbol; (v) based on a spatial relationship on the reels between the second symbol and a third symbol of the plurality of symbols; or (vi) based on a spatial relationship on the reels between the second symbol and a combination of symbols from the paytable.

20. The gaming system of claim 16, wherein the plurality of instructions, when executed by the at least one processor, cause the at least one processor to select the first and second symbols to function as wild symbols based on a predetermined sequence of wild symbols.

* * * * *

UNITED STATES PATENT AND TRADEMARK OFFICE

CERTIFICATE OF CORRECTION

PATENT NO. : 8,113,943 B2
APPLICATION NO. : 12/401330
DATED : February 14, 2012
INVENTOR(S) : Cuddy It is certified that error appears in the above-identified patent and that said Letters Patent is hereby corrected as shown below:

IN THE CLAIMS:

In Claim 1, Column 17, Line 58, replace "a" with --the--.

In Claim 2, Column 18, Line 2, replace "a" with --the--.

In Claim 4, Column 18, Line 14, replace "a wild symbol" with --the wild symbol--.

In Claim 5, Column 18, Line 17, between "the" and "symbols" insert --designated--.

In Claim 5, Column 18, Line 18, between "as" and "wild" insert --the--.

In Claim 5, Column 18, Line 18, replace "symbol" with --symbols--.

In Claim 5, Column 18, line 19, replace "of the symbols" with --symbol--.

In Claim 6, Column 18, Line 21, replace "a" with --the--.

In Claim 7, Column 18, Line 24, delete the second instance of "the.".

In Claim 9, Column 18, Line 31, replace the first instance of "a" with --the--.

In Claim 10, Column 18, Line 43, between "as" and "wild" insert --the--.

In Claim 10, Column 19, Line 43, replace "symbols" with --symbol--.

In Claim 11, Column 19, Line 10, replace "a" with --the--.

In Claim 12, Column 19, Line 15, replace "a" with --the--.

Signed and Sealed this
Third Day of April, 2012

David J. Kappos
*Director of the United States Patent and Trademark Office*

IN THE CLAIMS:

In Claim 13, Column 19, Line 18, delete “the.”.

In Claim 14, Column 19, Line 22, replace the first instance of “a” with --the--.

In Claim 15, Column 19, Line 34, between “as” and “wild” insert --the--.

In Claim 15, Column 19, Line 34, replace “symbols” with --symbol--.

In Claim 19, Column 20, Line 38, replace the first instance of “a” with --the--.

In Claim 20, Column 20, Line 50, between “as” and “wild” insert --the--.

In Claim 20, Column 20, Line 50, replace “symbols” with --symbol--.